United States Patent
Yamashita et al.

(10) Patent No.: US 12,107,209 B2
(45) Date of Patent: Oct. 1, 2024

(54) ELECTRODE GROUP, SECONDARY BATTERY, BATTERY PACK, AND VEHICLE

(71) Applicant: KABUSHIKI KAISHA TOSHIBA, Tokyo (JP)

(72) Inventors: Yasunobu Yamashita, Tokyo (JP); Tetsuya Sasakawa, Yokohama (JP); Yasuhiro Harada, Isehara (JP); Norio Takami, Yokohama (JP); Shinsuke Matsuno, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 109 days.

(21) Appl. No.: 17/462,507

(22) Filed: Aug. 31, 2021

(65) Prior Publication Data
US 2022/0293915 A1 Sep. 15, 2022

(30) Foreign Application Priority Data
Mar. 15, 2021 (JP) .................. 2021-041560

(51) Int. Cl.
*H01M 10/0525* (2010.01)
*B60L 50/64* (2019.01)
(Continued)

(52) U.S. Cl.
CPC ......... *H01M 10/0525* (2013.01); *B60L 50/64* (2019.02); *H01M 4/131* (2013.01);
(Continued)

(58) Field of Classification Search
CPC .. H01M 10/0525; H01M 4/131; H01M 4/485; H01M 4/62; H01M 10/058;
(Continued)

(56) References Cited

U.S. PATENT DOCUMENTS

| | | | |
|---|---|---|---|
| 2009/0092892 A1* | 4/2009 | Yamaguchi | H01M 4/134 204/554 |
| 2016/0285066 A1* | 9/2016 | Sakaguchi | H01M 10/0525 |

(Continued)

FOREIGN PATENT DOCUMENTS

| | | |
|---|---|---|
| JP | 20084535 A | 1/2008 |
| JP | 2013-239302 A | 11/2013 |

(Continued)

OTHER PUBLICATIONS

Office Action issued on May 7, 2024, in corresponding Japanese Application No. 2021-041560, 8 pages.

*Primary Examiner* — Milton I Cano
*Assistant Examiner* — Joshua P McClure
(74) *Attorney, Agent, or Firm* — Maier & Maier, PLLC

(57) ABSTRACT

According to an embodiment, an electrode group is provided. The electrode group includes a positive electrode, and a negative electrode. The negative electrode active material-containing layer includes a facing section which faces the positive electrode active material-containing layer and a non-facing section which does not. A first fluorine-containing coating is formed on a main surface of the negative electrode active material-containing layer in at least a part of the non-facing section. The abundance ratio of fluorine atoms included in the first fluorine-containing coating is in the range of 2.5 atom % to 10 atom %.

15 Claims, 8 Drawing Sheets

(51) Int. Cl.
- *H01M 4/131* (2010.01)
- *H01M 4/485* (2010.01)
- *H01M 4/62* (2006.01)
- *H01M 10/058* (2010.01)
- *H01M 50/249* (2021.01)
- *H01M 4/02* (2006.01)

(52) U.S. Cl.
CPC ............ *H01M 4/485* (2013.01); *H01M 4/62* (2013.01); *H01M 10/058* (2013.01); *H01M 50/249* (2021.01); *H01M 2004/027* (2013.01); *H01M 2220/20* (2013.01)

(58) Field of Classification Search
CPC ......... H01M 50/249; H01M 2004/024; H01M 2220/20; B60L 50/64
See application file for complete search history.

(56) References Cited

U.S. PATENT DOCUMENTS

| | | |
|---|---|---|
| 2017/0271661 A1 | 9/2017 | Yasuda et al. |
| 2018/0108933 A1 | 4/2018 | Nagaya et al. |
| 2019/0088982 A1* | 3/2019 | Sugizaki .................. H02J 7/14 |
| 2020/0303777 A1 | 9/2020 | Kawasoe et al. |

FOREIGN PATENT DOCUMENTS

| | | |
|---|---|---|
| JP | 2015144097 A | 8/2015 |
| JP | 201628382 A | 2/2016 |
| JP | 2016100051 A | 5/2016 |
| JP | 2017-168265 A | 9/2017 |
| JP | 201867384 A | 4/2018 |
| JP | 2018113164 A | 7/2018 |
| JP | 2018160416 A | 10/2018 |
| WO | 2019078159 A1 | 4/2019 |

* cited by examiner

ELECTRODE GROUP, SECONDARY BATTERY, BATTERY PACK, AND VEHICLE

CROSS-REFERENCE TO RELATED APPLICATIONS

This application is based upon and claims the benefit of priority from Japanese Patent Application No. 2021-041560, filed Mar. 15, 2021, the entire contents of which are incorporated herein by reference.

FIELD

Embodiments described herein relate generally to an electrode group, a secondary battery, a battery pack, and a vehicle.

BACKGROUND

Recently, secondary batteries, such as a nonaqueous electrolyte secondary battery like a lithium ion secondary battery, have been actively researched and developed as a high energy-density battery. The secondary batteries, such as a nonaqueous electrolyte secondary battery, are anticipated as a power source for vehicles such as hybrid electric automobiles, electric cars, an uninterruptible power supply for base stations for portable telephones, or the like. Therefore, the secondary battery is demanded to, in addition to having a high energy density, be excellent in other performances such as rapid charge-discharge performances and long-term reliability, as well. For example, not only is the charging time remarkably shortened in a secondary battery capable of rapid charge and discharge, but the battery is also capable of improving motive performances in vehicles such as hybrid electric automobiles, and efficient recovery of regenerative energy of motive force.

When producing a secondary battery, the area of the negative electrode may be set to be larger than that of the positive electrode for the purpose of suppressing any overcharging of the negative electrode. In this case, a current converges to the edge of the positive electrode, likely causing degradation of the positive electrode.

DETAILED DESCRIPTION

Figure 1:
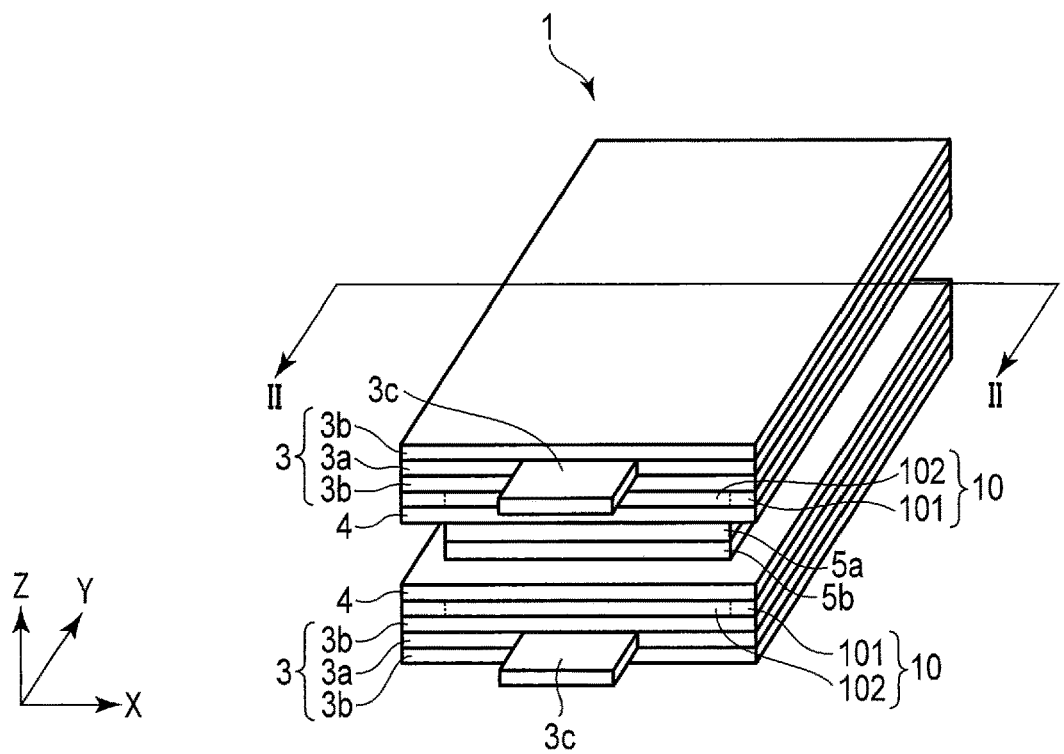
FIG. 1 is a perspective view schematically showing an example of an electrode group according to an embodiment.

According to one embodiment, an electrode group is provided. The electrode group includes a positive electrode including a positive electrode current collector and a positive electrode active material-containing layer on the positive electrode current collector, and a negative electrode including a negative electrode current collector and a negative electrode active material-containing layer on the negative electrode current collector. The area of the orthogonal projection of the negative electrode active material-containing layer to the negative electrode current collector is larger than the area of the orthogonal projection of the positive electrode active material-containing layer to the positive electrode current collector. The negative electrode active material-containing layer includes a facing section which faces the positive electrode active material-containing layer and a non-facing section which does not face the positive electrode active material-containing layer. A first fluorine-containing coating is formed on a main surface of the negative electrode active material-containing layer in at least a part of the non-facing section. The abundance ratio of fluorine atoms included in the first fluorine-containing coating is in the range of 2.5 atom % to 10 atom %.

According to another embodiment, a secondary battery is provided. The secondary battery includes an electrode group according to the embodiment, and an electrolyte.

According to another embodiment, a battery pack is provided. The battery pack includes the secondary battery according to the embodiment.

According to another embodiment, a vehicle is provided. The vehicle includes the battery pack according to the embodiment.

Hereinafter, embodiments will be described with reference to the drawings. The same reference signs are applied to common components throughout the embodiments and overlapped explanations are thereby omitted. Each drawing is a schematic view for encouraging explanations of the embodiment and understanding thereof, and thus there are some details in which a shape, a size and a ratio are different from those in a device actually used, but they can be appropriately design-changed considering the following explanations and known technology.

In general, the negative electrode may be designed to be larger in size than the positive electrode when producing a secondary battery for the purpose of preventing over-charging of the negative electrode. If a current converges from the outer periphery of the negative electrode, which is larger in size than the positive electrode, to the edge of the positive electrode, metal is eluted from the positive electrode, and a micro-short circuit, etc., thereby occurs, likely causing degradation of the positive electrode. Also, in a negative electrode which adopts an active material whose lattice volume is increased by charge and discharge, an active material-containing layer containing this active material may expand not only in the thickness direction but also in the lateral direction while going through plastic deformation. Namely, the active material-containing layer of the negative electrode designed to be larger than the positive electrode may further expand in the lateral direction (in-plane direction) due to charge and discharge. This case gives rise to a problem whereby a current flowing from the outer periphery of the negative electrode toward the positive electrode is more likely to converge to the edge of the positive electrode. Particularly in the case of electrodes having a high aspect ratio, a difference in dimensions easily occurs between the positive and negative electrodes on the long sides of the electrodes due to expansion of the active material-containing layer, thereby causing degradation of the positive electrode more easily.

First Embodiment

According to a first embodiment, an electrode group is provided. The electrode group includes a positive electrode including a positive electrode current collector and a positive electrode active material-containing layer on the positive electrode current collector, and a negative electrode including a negative electrode current collector and a negative electrode active material-containing layer on the negative electrode current collector. The area of the orthogonal projection of the negative electrode active material-containing layer to the negative electrode current collector is larger than the area of the orthogonal projection of the positive electrode active material-containing layer to the positive electrode current collector. The negative electrode active material-containing layer includes a facing section which faces the positive electrode active material-containing layer and a non-facing section which does not face the positive electrode active material-containing layer. A first fluorine-containing coating is formed on a main surface of the negative electrode active material-containing layer in at least a part of the non-facing section. The abundance ratio of fluorine atoms included in the first fluorine-containing coating is in the range of 2.5 atom % to 10 atom %.

The "orthogonal projection" as used herein and in the accompanying claims refers to the area of a plane on which the active material-containing layer is present, as observed from the active material-containing layer side toward the current collector of each electrode.

The electrode group according to the embodiment includes a fluorine-containing coating which contains fluorine atoms at a high concentration of 2.5 atom % to 10 atom %, in at least a part of the section (non-facing section) of the main surface of the negative electrode active material-containing layer that does not face the positive electrode active material-containing layer. The fluorine-containing coating, which contains fluorine atoms at an abundance ratio of 2.5 atom % to 10 atom %, has a high electric resistance. Therefore, a current is less likely to flow to the positive electrode active material-containing layer from the coated section of the main surface of the negative electrode active material-containing layer. Accordingly, the current density at the edge of the positive electrode active material-containing layer decreases, rendering it possible to suppress early degradation of the positive electrode.

In addition, when a secondary battery including the electrode group according to the embodiment is stored to change over time, self-discharge can be suppressed. Namely, a voltage decrease of the secondary battery due to the change over time can be suppressed.

Hereinafter, the electrode group according to the embodiment will be described with reference to the accompanying drawings.

Figure 2:
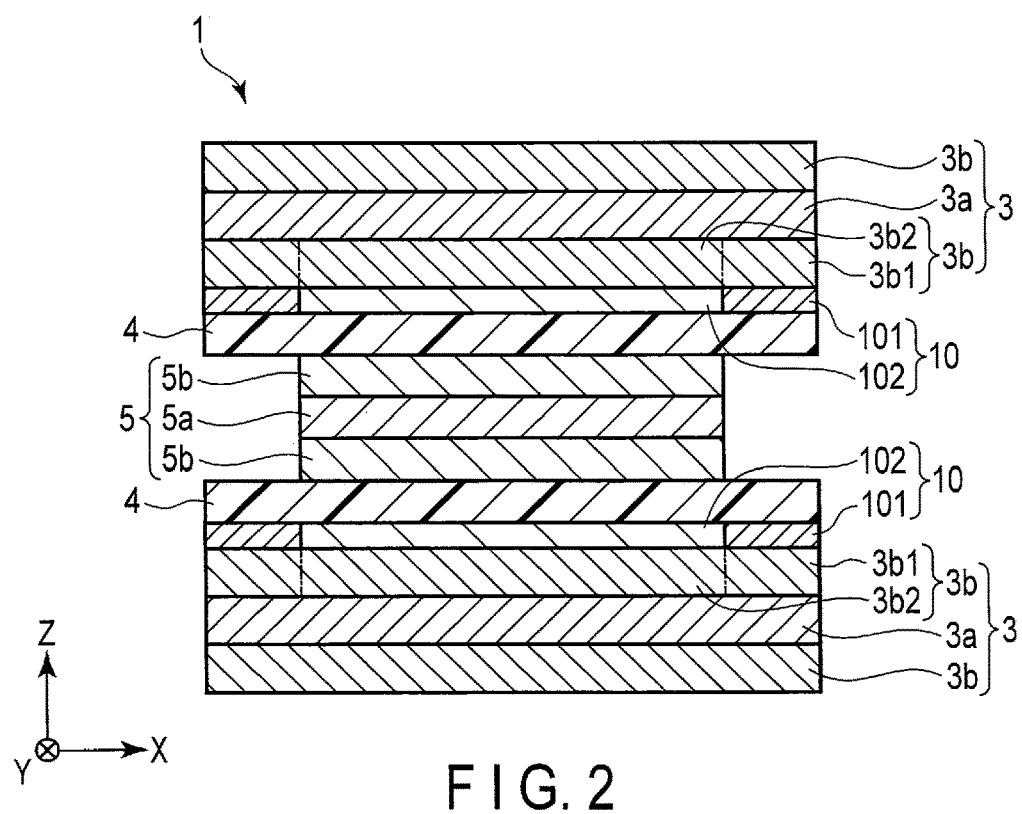
FIG. 2 is a cross-sectional view of the electrode group shown in FIG. 1, taken along line II-II.

FIG. 1 is a perspective view schematically showing an example of the electrode group according to the embodiment. FIG. 2 is a cross-sectional view of the electrode group shown in FIG. 1, taken along line II-II.

In the description below, the X direction and the Y direction are directions parallel to the main surfaces of the negative electrode active material-containing layer $3b$ and perpendicular to each other. The Z direction is a direction perpendicular to the X direction and the Y direction. Namely, the Z direction is a thickness direction. A direction parallel to the X direction and the Y direction is also referred to as an "in-plane direction".

An electrode group 1 shown in FIG. 1 includes a negative electrode 3, a positive electrode 5, and a separator 4 interposed therebetween. The negative electrode 3 includes a rectangular negative electrode current collector $3a$ made of, for example, a metal foil, and a negative electrode active material-containing layer $3b$ formed on both surfaces of the negative electrode current collector $3a$. The negative electrode 3 further includes a negative electrode current-collecting tab $3c$ (negative electrode tab section) formed of an end parallel to the short side of the negative electrode current collector $3a$. The positive electrode 5 includes a rectangular positive electrode current collector $5a$ made of, for example, a metal foil, and a positive electrode active material-containing layer $5b$ formed on both surfaces of the positive electrode current collector $5a$. Although not shown in the figure, a positive electrode current-collecting tab $5c$ (positive electrode tab section), formed of an end parallel to the short side of the positive electrode current collector $5a$, protrudes from the positive electrode current collector $5a$ on the side of the secondary battery facing the side from which the negative electrode tab section $3c$ protrudes. Namely, the positive electrode 5 further includes the positive electrode tab section $5c$.

The area (NA1) of the orthogonal projection of the negative electrode active material-containing layer $3b$ to the negative electrode current collector $3a$ is larger than the area (PA1) of the orthogonal projection of the positive electrode active material-containing layer $5b$ to the positive electrode current collector $5a$. The area (NA1) of the orthogonal projection of the negative electrode active material-containing layer $3b$ to the negative electrode current collector $3a$ can be calculated by, for example, multiplying the length of the negative electrode active material-containing layer $3b$ in the X direction and the length of the negative electrode active material-containing layer $3b$ in the Y direction. The area (PA1) of the orthogonal projection of the positive electrode active material-containing layer $5b$ to the positive electrode current collector $5a$ can be calculated by, for example, multiplying the length of the positive electrode active material-containing layer $5b$ in the X direction and the length of the positive electrode active material-containing layer $5b$ in the Y direction. In the electrode group 1, the dimension of the negative electrode 3 in the X direction is larger than the dimension of the positive electrode 5 in the X direction, and the dimension of the negative electrode 3 in the Y direction is also larger than the dimension of the positive electrode 5 in the Y direction.

The ratio (NA1/PA1) of the area (NA1) of the orthogonal projection of the negative electrode active material-containing layer $3b$ to the negative electrode current collector $3a$ to the area (PA1) of the orthogonal projection of the positive electrode active material-containing layer $5b$ to the positive electrode current collector 5a is, for example, in the range of 1.00<NA1/PA1≤1.20. In other words, the area NA1 has a size of, for example, 100.1% to 120% of the area PA1. As an example, the area NA1 may have a size of 105% of the area PA1 immediately after the electrode group is assembled. When a negative electrode active material whose lattice volume varies due to charge and discharge is used as the negative electrode active material described later, the area NA1 may have a size of 110% of the area PA1. The difference in dimensions between the negative and positive electrodes is not particularly limited; however, if the difference in dimensions is excessively large, the effect of the first fluorine-containing coating suppressing convergence of a current to the edge of the positive electrode tends to be difficult to obtain.

The ratio (aspect ratio) of the length of the negative electrode active material-containing layer 3b in the Y direction to the length of the negative electrode active material-containing layer 3b in the X direction is, for example, in the range of 1:1 to 20:1. The side of the negative electrode active material-containing layer 3b along the X direction may be the long side or the short side of the negative electrode active material-containing layer. Also, the side of the negative electrode active material-containing layer 3b along the Y direction may be the long side or the short side of the negative electrode active material-containing layer. The length of the negative electrode active material-containing layer 3b in the X direction and the length of the negative electrode active material-containing layer 3b in the Y direction may be the same. When the aspect ratio is 5:1 or more, the effect of suppressing convergence of a current from a non-facing section 3b1 of the negative electrode active material-containing layer 3b to the edge of the positive electrode can be obtained more easily on the long side of the negative electrode active material-containing layer, which is thus favorable.

The dimensions of the negative electrode active material-containing layer are not particularly limited; however, the negative electrode active material-containing layer may, for example, have the following dimensions. The length of the short side of the negative electrode active material-containing layer 3b is, for example, in the range of 2 cm to 20 cm. The length of the long side of the negative electrode active material-containing layer 3b is, for example, in the range of 2 cm to 40 cm. The thickness (the length along the Z direction) of the negative electrode active material-containing layer is, for example, in the range of 10 µm to 100 µm.

The dimensions of the positive electrode active material-containing layer are not particularly limited; however, the positive electrode active material-containing layer may, for example, have the following dimensions. The length of the short side of the positive electrode active material-containing layer 5b is, for example, in the range of 2 cm to 40 cm. The length of the long side of the positive electrode active material-containing layer 5b is, for example, in the range of 2 cm to 40 cm. The thickness (the length along the Z direction) of the positive electrode active material-containing layer is, for example, in the range of 10 µm to 100 µm.

The shape of the orthogonal projection of the negative electrode active material-containing layer to the negative electrode current collector is not particularly limited, and may be a square shape, a rectangular shape, a polygonal shape, a circular shape, an elliptical shape, or the like. The shape of the orthogonal projection can be varied through varying the shape of the negative electrode in accordance with the shape of a target secondary battery. The shape of the orthogonal projection of the positive electrode active material-containing layer to the positive electrode current collector is not particularly limited, and may be a polygonal shape, a square shape, a rectangular shape, a circular shape, an elliptical shape, or the like. The shape of the orthogonal projection of the positive electrode active material-containing layer to the positive electrode current collector may be the same as the shape of the orthogonal projection of the negative electrode active material-containing layer to the negative electrode current collector.

As shown in FIGS. 1 and 2, a part of the negative electrode active material-containing layer 3b faces the positive electrode active material-containing layer 5b. The negative electrode active material-containing layer 3b is formed of a non-facing section 3b1, which does not face the positive electrode active material-containing layer 5b, and a facing section 3b2, which faces the positive electrode active material-containing layer 5b. The three-dimensional shape of the non-facing section 3b1 may be an annular rectangular column shape. The shape of the non-facing section 3b1 is not particularly limited, and may be an annular cylindrical column shape. The non-facing section 3b1 may be, for example, a rectangular parallelepiped shape.

A fluorine-containing coating 10 is formed on a main surface of the negative electrode active material-containing layer 3b. The separator 4 is interposed between the fluorine-containing coating 10 and the positive electrode 5 in order to ensure electric insulation between the negative electrode 3 and the positive electrode 5. The main surface of the negative electrode active material-containing layer 3b refers to the surface of the negative electrode active material-containing layer 3b extending in the X direction and the Y direction. The main surface of the negative electrode current collector 3a and the main surface of the negative electrode active material-containing layer 3b may be surfaces extending in parallel or substantially in parallel with each other. The fluorine-containing coating 10 is formed on one of the two main surfaces of the negative electrode active material-containing layer 3b on the side not in contact with the negative electrode current collector 3a.

The fluorine-containing coating 10 includes, for example, a first fluorine-containing coating 101 containing fluorine at a high concentration and a second fluorine-containing coating 102 containing fluorine at a concentration lower than that of the first fluorine-containing coating 101. The first fluorine-containing coating 101 and the second fluorine-containing coating 102 may form a single continuous fluorine-containing coating 10. The abundance ratio of fluorine included in the fluorine-containing coating 10 can be analyzed by the scanning electron microscope-energy dispersive X-ray spectroscopy (SEM-EDX) described later. In the fluorine-containing coating 10, the abundance ratio of fluorine may continuously vary from the first fluorine-containing coating 101 to the second fluorine-containing coating 102.

The first fluorine-containing coating 101 is formed on the main surface of the negative electrode active material-containing layer 3b in the non-facing section 3b1. As described above, the first fluorine-containing coating 101 containing fluorine at a high concentration has high electric resistance. Therefore, it can suppress intensive current flow from the outer periphery of the negative electrode active material-containing layer 3b, such as the non-facing section 3b1, toward the edge of the positive electrode active material-containing layer 5b. FIGS. 1 and 2 show, as an example, a case where the first fluorine-containing coating 101 is present on the entire region of the non-facing section 3b1. However, the effect of suppressing degradation of the positive electrode can be obtained as long as the first fluorine-containing coating 101 is present on at least a part of the non-facing section 3b1.

The first fluorine-containing coating 101 is formed on the main surface of the negative electrode active material-containing layer 3b in a proportion of, for example, 10% to 100% of the area (NA2) of the orthogonal projection of the non-facing section 3b1 to the negative electrode current collector 3a. The above proportion may be in the range of 30% to 100% or in the range of 50% to 80%. The higher the above proportion is, the greater the possibility of suppressing convergence of a current to the edge of the positive electrode active material-containing layer 5b.

The second fluorine-containing coating 102 is formed on the main surface of the negative electrode active material-containing layer 3b in at least a part of the facing section 3b2. FIGS. 1 and 2 show, as an example, a case where the second fluorine-containing coating 102 is present on the entire region of the facing section 3b2. As long as the first fluorine-containing coating 101 is formed on at least a part of the non-facing section 3b1, the second fluorine-containing coating 102 need not be formed. Even in this case, degradation of the positive electrode 5 can be suppressed because the first fluorine-containing coating 101 is formed on the non-facing section 3b1.

The abundance ratio of fluorine atoms included in the first fluorine-containing coating 101 is in the range of 2.5 atom % to 10 atom %, preferably in the range of 4.0 atom % to 8.0 atom %. The abundance ratio of fluorine atoms included in the first fluorine-containing coating 101 may be in the range of 2.5 atom % to 6.0 atom %. If the abundance ratio is less than 2.5 atom %, the effect of increasing the electric resistance by way of the first fluorine-containing coating 101 will be insufficient, likely rendering it difficult to suppress degradation of the positive electrode. If the abundance ratio is greater than 10 atom %, an unfavorable situation may occur in which the output characteristics excessively degrade.

The abundance ratio of fluorine atoms included in the second fluorine-containing coating 102 is, for example, in the range of 0.1 atom % or more and less than 2.5 atom %, preferably in the range of 0.2 atom % to 1.5 atom %. If the abundance ratio is too high, an unfavorable situation may occur in which the electric resistance between the positive and negative electrodes increases and the output characteristics decrease.

The thickness of the first fluorine-containing coating 101 is not particularly limited as long as the abundance ratio of fluorine atoms is in the range of 2.5 atom % to 10 atom %; however, the thickness is, for example, in the range of 10 nm to 100 nm. The thickness of the second fluorine-containing coating 102 is, for example, in the range of 10 nm to 30 nm.

Although FIGS. 1 and 2 show, as an example, the case where the electrode group 1 is a stacked electrode group, the electrode group according to the embodiment may be a wound electrode group. Although FIGS. 1 and 2 show the case where the electrode group 1 includes two negative electrodes 3, two separators 4, and one positive electrode 5 stacked on top of each other and thus has a substantially rectangular parallelepiped shape; however, the electrode group 1 may have a substantially circular column shape. The shape of the electrode group 1 can be changed appropriately in accordance with the shape of a target secondary battery.

Figure 3:
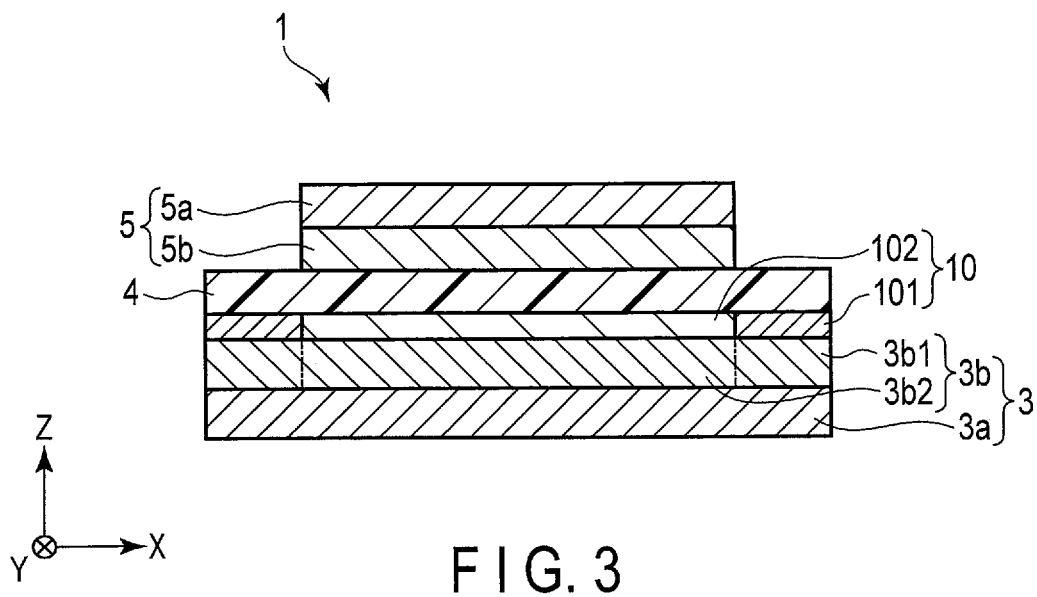
FIG. 3 is a cross-sectional view schematically showing another example of the electrode group according to the embodiment.

In the electrode group 1 shown in FIGS. 1 and 2, the positive electrode 5 is interposed between the two negative electrodes 3 with the separator 4 interposed between the positive electrode 5 and each of the negative electrodes 3; however, the number of negative electrodes 3 may be single. FIG. 3 shows an example of a case where the electrode group 1 includes one negative electrode 3 and one positive electrode 5. The negative electrode active material-containing layer 3b is formed on, for example, one side of the negative electrode current collector 3a. The negative electrode active material-containing layer 3b may be formed on both sides of the negative electrode current collector 3a. The positive electrode active material-containing layer 5b is formed on one side of the positive electrode current collector 5a. The positive electrode active material-containing layer 5b may be formed on both sides of the positive electrode current collector 5a.

In the electrode group 1 shown in FIG. 3, the negative electrode active material-containing layer 3b formed on one side of the negative electrode current collector 3a and the positive electrode active material-containing layer 5b formed on one side of the positive electrode current collector 5a face each other. Specifically, the negative electrode active material-containing layer 3b and the positive electrode active material-containing layer 5b face each other with the separator 4 interposed therebetween. In addition, the fluorine-containing coating 10 is formed on the main surface of the negative electrode active material-containing layer 3b. According to the electrode group 1 shown in FIG. 3, it is possible to suppress convergence of a current flowing from the non-facing section 3b1 of the negative electrode active material-containing layer 3b to the edge of the positive electrode active material-containing layer 5b, as in the case of the electrode group 1 described with reference to FIGS. 1 and 2.

Figure 4:
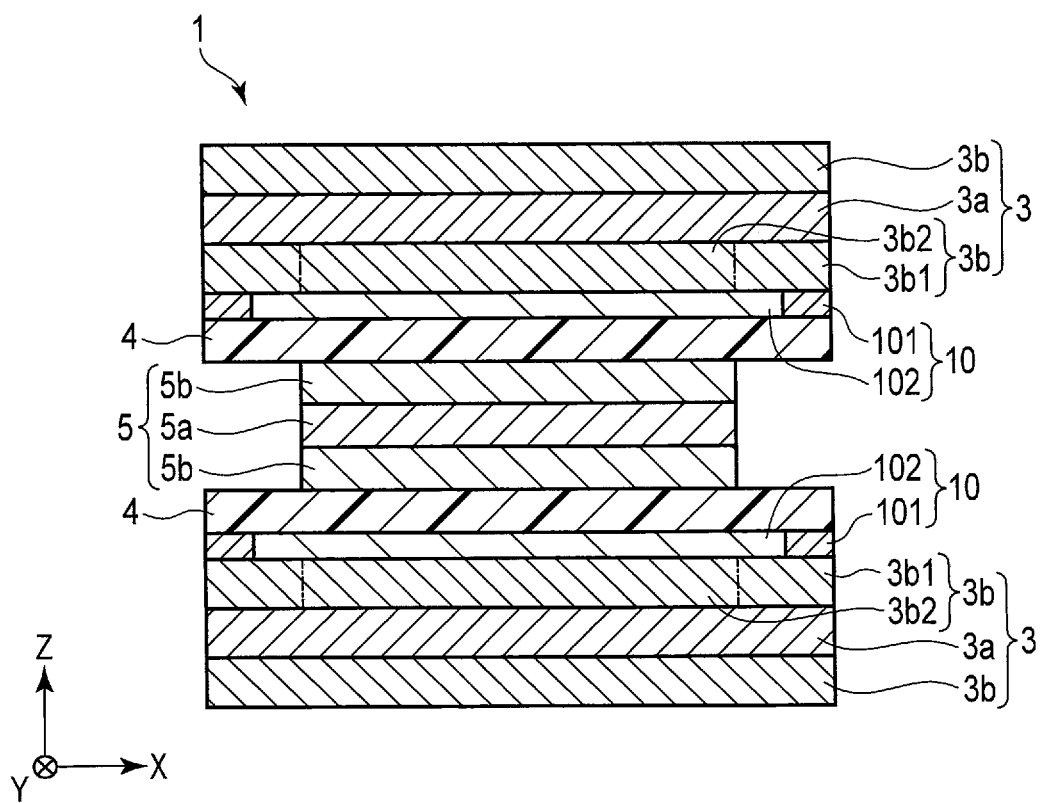
FIG. 4 is a cross-sectional view schematically showing another example of the electrode group according to the embodiment.

FIG. 4 is a cross-sectional view schematically showing another example of the electrode group according to the embodiment. The electrode group 1 shown in FIG. 4 has the same configuration as that of the electrode group 1 described with reference to FIGS. 1 and 2, except the configuration of the fluorine-containing coating 10.

In the electrode group 1 shown in FIG. 4, the first fluorine-containing coating 101 is not formed on the entire region of the non-facing section 3b1. In the cross-sectional view of FIG. 4, first, the width of the non-facing section 3b1 is defined in order to define the region where the first fluorine-containing coating 101 is formed on the main surface (i.e., on the non-facing section 3b1) of the negative electrode active material-containing layer 3b. The width of the non-facing section 3b1 is defined by the distance from the side surface of the negative electrode active material-containing layer 3b to the boundary surface between the non-facing section 3b1 and the facing section 3b2 in any single direction along the in-plane direction of the negative electrode active material-containing layer 3b. The aforementioned "any single direction along the in-plane direction of the negative electrode active material-containing layer 3b" is herein referred to as a "first direction". For example, if the electrode is cut at any position along the Z direction, the in-plane direction of the negative electrode active material-containing layer 3b perpendicular to this cut surface will be the first direction. The first direction may be, for example, a direction parallel to the X direction. Alternatively, the first direction may be a direction where the length of the negative electrode active material-containing layer 3b along the in-plane direction is largest.

The cross-sectional view of the electrode group 1 in FIG. 4 shows a cross section of the electrode group 1 cut along the first direction (a direction parallel to the X direction in this example). The first fluorine-containing coating 101 is formed in a region extending from the side surface of the negative electrode active material-containing layer 3b to a position at 50% of the width of the non-facing section 3b1, on the main surface of the negative electrode active material-containing layer 3b toward the facing section 3b2 along the first direction. The region where the first fluorine-containing coating 101 is formed is not limited to the aforementioned region from the side surface of the negative electrode active material-containing layer 3b to a position at 50% of the width of the non-facing section 3b1 on the main surface of the negative electrode active material-containing layer 3b. The first fluorine-containing coating 101 may be formed in a region from the side surface of the negative electrode active material-containing layer 3b to a position at 10% to 150% of the width of the non-facing section 3b1, on the main surface of the negative electrode active material-containing layer 3b toward the facing section 3b2 along the first direction. Exceeding of 100% by the aforementioned proportion signals the presence of first fluorine-containing coating 101 on the facing section 3b2. The first fluorine-containing coating 101 may be formed on a part of the facing section 3b2 as well as on at least a part of the non-facing section 3b1.

The first fluorine-containing coating 101 is preferably formed in a region extending from the side surface of the negative electrode active material-containing layer 3b to a position at 30% to 120%, more preferably at 50% to 100%, of the width of the non-facing section 3b1 on the main surface of the negative electrode active material-containing layer 3b. If the aforementioned proportion is too large, the electric resistance in the facing section 3b2 of the negative electrode active material-containing layer 3b will be high, likely resulting in degradation of the output characteristics.

<Composition Analysis of Fluorine-Containing Coating>

The composition of the fluorine-containing coating can be analyzed according to the SEM-EDX. For example, Miniscope TM3030 manufactured by Hitachi, Ltd., can be used as an apparatus for performing an SEM observation. For example, Quantax70 manufactured by Bruker can be used as an apparatus for performing an EDX analysis.

First, a secondary battery as an analysis target is prepared and then completely discharged. Next, the secondary battery is dissembled in an inert atmosphere to remove the electrode group. Then, the negative electrode is removed from the electrode group, immersed in propylene carbonate for three minutes, and then immersed in dimethyl carbonate for three minutes to wash the negative electrode. The washed negative electrode is vacuum dried and used as an analysis sample. Separately, the electrode group is cut along any direction (the first direction), and the widths of the non-facing section and the facing section are measured from the obtained cross-section. When the outer periphery of the orthogonal projection of the negative electrode active material-containing layer to the negative electrode current collector has a rectangular shape, the first direction is determined to be a direction parallel to either the short side or the long side of the rectangle. When the outer periphery of the orthogonal projection of the negative electrode active material-containing layer to the negative electrode current collector has a shape other than a rectangular shape, the first direction is determined to be a direction where the length of the negative electrode active material-containing layer along the in-plane direction is largest.

When the outer periphery of the orthogonal projection of the negative electrode active material-containing layer to the negative electrode current collector is rectangular, the negative electrode as an analysis sample is observed according to the SEM-EDX, as follows. Namely, the positions of the centers of the four sides of the non-facing section are determined as measurement points. For each of the four measurement points, a composition analysis according to the SEM-EDX is performed in the view of 200 μm×200 μm so as to include a section at 200 μm from the edge of the negative electrode active material-containing layer. An average of the four values obtained is determined as the abundance ratio of fluorine atoms in the non-facing section. The intersection connecting two diagonal lines of the rectangle is regarded as the center of the rectangle. An observation according to the SEM-EDX is performed in the view of 200 μm×200 μm so as to include this center, and the obtained value is determined as the abundance ratio of fluorine atoms of the facing section.

On the other hand, when the outer periphery of the orthogonal projection of the negative electrode active material-containing layer to the negative electrode current collector has a non-rectangular shape, such as a circular or elliptical one, the negative electrode as an analysis sample is observed according to the SEM-EDX, as follows. In the case of a circular shape or an elliptical shape, the intersection of the long and short axes is regarded as the center of said shape. A first imaginary straight line is set which passes through this center and extends along the in-plane direction of the negative electrode active material-containing layer. Also, a second imaginary straight line is set which perpendicularly intersects the first straight line at the above center and extends along the in-plane direction of the negative electrode active material-containing layer. In a total of four regions, including two where the first straight line and the non-facing section intersect and two where the second straight line and the non-facing section intersect, a composition analysis according to the SEM-EDX is performed in the view of 200 μm×200 μm so as to include the section at 200 μm from the edge of the negative electrode active material-containing layer. An average of the four values obtained is determined as the abundance ratio of fluorine atoms in the non-facing section. Also, an observation according to the SEM-EDX is performed in the view of 200 μm×200 μm so as to include the center defined by the intersection of the long and short axes, and the obtained value is determined as the abundance ratio of fluorine atoms of the facing section.

Whatever the shape of the orthogonal projection of the negative electrode active material-containing layer to the negative electrode current collector, when an average value of the abundance ratios of fluorine analyzed in the multiple regions is in the range of 2.5 atom % to 10 atom %, the analysis-target electrode group can be determined to include the first fluorine-containing coating on the surface of the non-facing section of the negative electrode active material-containing layer.

In addition, the proportion of the first fluorine-containing coating formed with respect to the area (NA2) of the orthogonal projection of the non-facing section to the negative electrode current collector can be measured from an elemental mapping image of the main surface of the negative electrode active material-containing layer. Also, the proportion of the length of the first fluorine-containing coating formed can be measured by measuring the abundance ratio of fluorine atoms from the side surface of the negative electrode active material-containing layer along the first direction. The proportion of the width of the first fluorine-containing coating formed with respect to the width of the non-facing section can be calculated from the obtained abundance ratio of fluorine along the first direction. The proportion of the first fluorine-containing coating with respect to the area of the non-facing section can also be calculated by measuring the fluorine concentration in the entire region of the non-facing section. For the calculation, the results of the SEM image analysis obtained by measuring the entire region of the non-facing section at a predetermined measurement magnification and at predetermined sampling intervals can be used. At this time, the proportion of the first fluorine-containing coating with respect to the area of the non-facing section corresponds to the total number of SEM images for the number of SEM images satisfying the concentration range of the first fluorine-containing coating. The total number of SEM images is preferably 20 or more in view of measurement accuracy.

The details of the components forming the first fluorine-containing coating and/or the second fluorine-containing coating are not revealed; however, the first fluorine-containing coating and/or the second fluorine-containing coating include(s), for example, lithium fluoride and a compound including fluorine atoms bonded to organic atoms. The organic atoms are, for example, at least one of carbon atoms or phosphorus atoms.

<Method for Manufacturing Electrode Group>

The electrode group with the fluorine-containing coating formed on the non-facing section of the negative electrode active material-containing layer can be produced by, for example, holding a secondary battery after initial charge in a high-temperature environment, that is, by subjecting a secondary battery after an initial charge to an aging process. By performing an aging process under predetermined conditions, Li salts decompose in an electrolytic solution, so that a coating containing fluorine atoms at a high concentration can be formed on the non-facing section of the negative electrode active material-containing layer. Alternatively, the high-concentration fluorine-containing coating according to the embodiment can be formed by performing vapor deposition such as sputtering on the main surface of the negative electrode active material-containing layer.

After the secondary battery including the negative electrode is assembled, the secondary battery is subjected to initial charge and aging. When performing initial charge, the potential of the negative electrode is preferably lower than 1.2 V (vs. $Li^+/Li$). By setting the potential of the negative electrode to a low potential, the first fluorine-containing coating having an abundance ratio of fluorine atoms in the range of 2.5 atom % to 10 atom % is easily formed. In order to form the high-concentration fluorine-containing coating, the potential of the negative electrode at the time of initial charge is preferably 1.1 V (vs. $Li^+/Li$) or less, and more preferably 1.0 V (vs. $Li^+/Li$) or less.

For example, the aging is preferably performed on the secondary battery having a battery voltage in the range of 1.0 V to 3.2 V in the SOC of 80% to 100%. Also, the aging is preferably performed in a temperature environment of 45° C. to 95° C. for 10 to 48 hours. The SOC herein refers to a discharge capacity (C) at the time of performing charge and discharge within a recommended potential, and a charge amount at the time of performing charge at a current value of 0.1 C to 1 C from the recommended discharge state.

If the SOC, the battery voltage, or the aging temperature is too low, or the aging time is too short, the first fluorine-containing coating having an abundance ratio of fluorine atoms in the range of 2.5 atom % to 10 atom % may not be formed. If the SOC, the battery voltage, or the aging temperature is too high, or the aging time is too long, an unfavorable situation occurs in which the battery resistance increases because the fluorine concentration in the second fluorine-containing coating becomes high. The battery voltage when the aging is performed is preferably in the range of 2.8 V to 3.2 V. The aging temperature is preferably in the range of 60° C. to 80° C. The aging time is more preferably in the range of 10 to 24 hours.

In the case of producing an electrode group by the method including initial charge and aging, the electrolytic solution preferably contains an electrolyte salt including fluorine atoms.

The vapor deposition can be performed on the main surface of the negative electrode active material-containing layer by, for example, performing high-frequency sputtering described below. A fluorine resin as a sputtering target is vapor-deposited on the electrode placed in a vacuum chamber decompressed to $10^{-3}$ Pa. Examples of the fluorine resin that can be used include polytetrafluoroethylene (PTFE), polyvinylidene difluoride (PVDF), and fluoroethylene propylene (FEP). Ar sputtering is performed at an inputted power of 100 W. As the electrode to be placed in the chamber, an electrode cut out into a predetermined shape or an electrode on which the vapor deposition is to be performed while transporting the roll may be employed. At this time, a coating containing fluorine at a high concentration can be formed only on the outer periphery by masking the center of the electrode.

The negative electrode, positive electrode, and separator included in the electrode group according to the embodiment will be described below. The electrode group may include one or more negative electrodes, one or more positive electrodes, and one or more separators. The negative electrode and the positive electrode may be alternately arranged with the separator interposed therebetween.

(1) Negative Electrode

The negative electrode may include a negative electrode current collector and a negative electrode active material-containing layer. The negative electrode active material-containing layer may be formed on both surfaces or one surface of the negative electrode current collector. The negative electrode active material-containing layer can contain a negative electrode active material, and optionally a conductive agent and a binder.

The fluorine-containing coating described above is formed on the main surface of the negative electrode active material-containing layer on the side facing the positive electrode. The fluorine-containing coating includes at least the first fluorine-containing coating having an abundance ratio of fluorine in the range of 2.5 atom % to 10 atom %. The fluorine-containing coating may further include the second fluorine-containing coating having an abundance ratio of fluorine in the range of 0.1 atom % or more and less than 2.5 atom %. Since the second fluorine-containing coating may function as a protective coating on the surface of the active material, degradation of the active material can be suppressed.

The negative electrode active material includes at least one selected from the group consisting of a carbon material, silicon, a silicon oxide, and a titanium-containing oxide. Examples of the carbon material include artificial graphite, natural graphite, and spindle-shaped graphite obtained by consolidating natural graphite and coating it with carbon.

Examples of the titanium-containing oxide include lithium titanate (e.g. $Li_{2+y}Ti_3O_7$, $0 \leq y \leq 3$) having a ramsdellite structure, lithium titanate (e.g. $Li_{4+x}Ti_5O_{12}$, $0 \leq x \leq 3$) having a spinel structure, monoclinic titanium dioxide ($TiO_2$), anatase-type titanium dioxide, rutile-type titanium dioxide, a hollandite-type titanium composite oxide, a monoclinic niobium titanium composite oxide, an orthorhombic titanium-containing composite oxide. Among them, the negative electrode active material preferably includes a titanium-containing oxide because it can achieve both a high capacity and high rate performance. Among titanium-containing oxides, a monoclinic niobium-titanium composite oxide whose volume expands and contracts when charge and discharge are performed is preferred because the effects of the present invention can be easily obtained when said monoclinic niobium-titanium composite oxide is used. The negative electrode active material may include only a monoclinic niobium-titanium composite oxide. In the case of the active material whose volume does not expand or contract when charge and discharge are performed, the area (NA1) of the orthogonal projection of the negative electrode active material-containing layer to the negative electrode current collector increases fairly negligibly does not increase that much. Therefore, degradation of the positive electrode due to convergence of a current to the edge of the positive electrode is less likely to occur.

Examples of the monoclinic niobium titanium composite oxide include a compound represented by $Li_xTi_{1-y}M1_yNb_{2-z}M2_zO_{7+\delta}$. Here, M1 is at least one selected from the group consisting of Zr, Si, and Sn. M2 is at least one selected from the group consisting of V, Ta, and Bi. The respective subscripts in the composition formula are specified as follows: $0 \leq x \leq 5$, $0 \leq y \leq 1$, $0 \leq z \leq 2$, and $-0.3 \leq \delta \leq 0.3$. Specific examples of the monoclinic niobium titanium composite oxide include $Li_xNb_2TiO_7$ ($0 \leq x \leq 5$).

Another example of the monoclinic niobium titanium composite oxide is a compound represented by $Ti_{1-y}M3_{y+z}Nb_{2-z}O_{7-\delta}$. Here, M3 is at least one selected from Mg, Fe, Ni, Cc, W, Ta, and Mo. The respective subscripts in the composition formula are specified as follows: $0 \leq y \leq 1$, $0 \leq z \leq 2$, and $-0.3 \leq \delta \leq 0.3$.

Examples of the orthorhombic titanium-containing composite oxide include a compound represented by $Li_{2+a}M(I)_{2-b}Ti_{6-c}M(II)_dO_{14+\sigma}$. Here, M(I) is at least one selected from the group consisting of Sr, Ba, Ca, Mg, Na, Cs, Rb and K. M(II) is at least one selected from the group consisting of Zr, Sn, V, Nb, Ta, Mo, W, Y, Fe, Co, Cr, Mn, Ni and Al. The respective subscripts in the composition formula are specified as follows: $0 \leq a \leq 6$, $0 \leq b < 2$, $0 \leq c < 6$, $0 \leq d < 6$, and $-0.5 \leq \sigma \leq 0.5$. Specific examples of the orthorhombic titanium-containing composite oxide include $Li_{2+a}Na_2Ti_6O_{14}$ ($0 \leq a \leq 6$).

A conductive agent is added in order to increase the current-collecting performance and to suppress the contact resistance between the active material and the current collector. Examples of the conductive agent include carbonaceous materials such as vapor grown carbon fiber (VGCF), carbon black such as acetylene black, and graphite. The conductive agents may be used alone or as a mixture of two or more kinds. Alternatively, instead of using the conductive agent, carbon coating or electron conductive inorganic material coating may be performed on surfaces of the active material particles.

The binder is added to fill gaps among the dispersed active material and also to bind the active material with the negative electrode current collector. Examples of the binder include polytetrafluoro ethylene (PTFE), polyvinylidene fluoride (PVdF), fluororubber, styrene-butadiene rubber, ethylene-propylene rubber, a polyacrylic acid compound, polyimide, polyamide, carboxymethyl cellulose (CMC), and salts of CMC. One of these, or two or more in combination, may be used as the binder.

A compounding ratio of the negative electrode active material, the conductive agent and the binder in the negative electrode active material-containing layer can be appropriately changed according to the application of the negative electrode. It is preferable that the negative electrode active material, the conductive agent, and the binder are respectively added in a proportion within a range of 70% by mass to 96% by mass, 2% by mass to 28% by mass, and 2% by mass to 28% by mass. When the content of the conductive agent is not less than 2% by mass, the current-collecting performance of the negative electrode active material-containing layer can be improved. In addition, when the content of the binder is not less than 2% by mass, the binding property between the negative electrode active material-containing layer and the current collector is sufficient, and the excellent cycle performance can be expected. On the other hand, in order to make the capacity higher, it is preferable that the contents of the conductive agent and the binder are respectively not more than 28% by mass.

The negative electrode current collector is formed a material which is electrochemically stable at a potential at which lithium (Li) is inserted into and extracted from the active material, for example, a potential higher than 1.0 V (vs. $Li/Li^+$). For example, the current collector is preferably made of copper, nickel, stainless steel or aluminum, or an aluminum alloy including at least one element selected from Mg, Ti, Zn, Mn, Fe, Cu, and Si. The thickness of the current collector is preferably 5 μm to 20 μm. The current collector having such a thickness can achieve a balance between the strength and reduction in weight of the electrode.

The negative electrode current collector may include a portion where the negative electrode active material-containing layer is not formed on a surface of the negative electrode current collector. This portion can serve as a negative electrode tab.

The density of the negative electrode active material-containing layer (not including the current collector) is preferably 1.8 $g/cm^3$ to 2.8 $g/cm^3$. The negative electrode, in which the density of the negative electrode active material-containing layer is within this range, is excellent in terms of energy density and holding property of the electrolyte. The density of the negative electrode active material-containing layer is more preferably 2.1 $g/cm^3$ to 2.6 $g/cm^3$.

The negative electrode can be fabricated, for example, by the following method. To start with, a negative electrode active material, a conductive agent and a binder are suspended in a solvent, and thus a slurry is prepared. Examples of the solvent include water, and N-methyl-2-pyrrolidone (NMP). As described above, when water is used as the solvent, even if the amount of the binder is decreased, the crack in the active material-containing layer and the peeling from the current collector at the time of drying a coating film (active material-containing layer) can be suppressed by leaving the moisture in the active material-containing layer to some degree. The prepared slurry is coated on one surface or both surfaces of the negative electrode current collector. Then, the coated slurry is dried, and a multilayer body of the negative electrode active material-containing layer and the negative electrode current collector is obtained. Thereafter, the multilayer body is subjected to pressing. Thus, the negative electrode is fabricated.

Alternatively, the negative electrode may be fabricated by the following method. To begin with, a negative electrode active material, a conductive agent and a binder are mixed, and a mixture is obtained. Then, the mixture is formed into pellets. Then, the pellets are disposed on the negative electrode current collector, and thus the negative electrode can be obtained.

(2) Positive Electrode

The positive electrode can include a positive electrode current collector and a positive electrode active material-containing layer. The positive electrode active material-containing layer can be formed on one side or both sides of the positive electrode current collector. The positive electrode active material-containing layer can contain a positive electrode active material, and optionally a conductive agent and a binder. A gel electrolyte serving as a gel polymer layer may be impregnated in the positive electrode active material-containing layer. Whether or not the gel electrolyte is impregnated in the positive electrode active material-containing layer can be confirmed by the above-described gel permeation chromatography.

Examples of the positive electrode active material include oxides and sulfides. The positive electrode may include, as the positive electrode active material, one type of compound or two or more different types of compounds. Examples of the oxides and the sulfides may include compounds allowing lithium or lithium ions to be inserted thereinto or extracted therefrom.

Examples of such compounds include manganese dioxides ($MnO_2$), iron oxides, copper oxides, nickel oxides, lithium manganese composite oxides (e.g., $Li_xMn_2O_4$ or $Li_xMnO_2$; $0<x\leq1$), lithium nickel composite oxides (e.g., $Li_xNiO_2$; $0<x\leq1$), lithium cobalt composite oxides (e.g., $Li_xCoO_2$; $0<x\leq1$), lithium nickel cobalt composite oxides (e.g., $Li_xNi_{1-y}Co_yO_2$; $0<x\leq1$, $0<y<1$), lithium manganese cobalt composite oxides (e.g., $Li_xMn_yCo_{1-y}O_2$; $0<x\leq1$, $0<y<1$), lithium manganese nickel composite oxides having a spinel structure (e.g., $Li_xMn_{2-y}Ni_yO_4$; $0<x\leq1$, $0<y<2$), lithium phosphates having an olivine structure (e.g., $Li_xFePO_4$; $0<x\leq1$, $Li_xFe_{1-y}Mn_yPO_4$; $0<x\leq1$, $0<y<1$, and $Li_xCoPO_4$; $0<x\leq1$), iron sulfates [$Fe_2(SO_4)_3$], vanadium oxides (e.g., $V_2O_5$), and lithium nickel cobalt manganese composite oxides ($Li_xNi_{1-y-z}Co_yMn_zO_2$; $0<x\leq1$, $0<y<1$, $0<z<1$, $y+z<1$).

Among the above, examples of compounds more preferable as the positive electrode active material include lithium manganese composite oxides having a spinel structure (e.g., $Li_xMn_2O_4$; $0<x\leq1$), lithium nickel composite oxides (e.g., $Li_xNiO_2$; $0<x\leq1$), lithium cobalt composite oxides (e.g., $Li_xCoO_2$; $0<x\leq1$), lithium nickel cobalt composite oxides (e.g., $Li_xNi_{1-y}Co_yO_2$; $0<x\leq1$, $0<y\leq1$), lithium manganese nickel composite oxides having a spinel structure (e.g., $Li_xMn_{2-y}Ni_yO_4$; $0<x\leq1$, $0<y<2$), lithium manganese cobalt composite oxides (e.g., $Li_xMn_yCo_{1-y}O_2$; $0<x\leq1$, $0<y<1$), lithium iron phosphates (e.g., $Li_xFePO_4$; $0<x\leq1$), and lithium nickel cobalt manganese composite oxides ($Li_xNi_{1-y-z}Co_yMn_zO_2$; $0<x\leq1$, $0<y<1$, $0<z<1$, $y+z<1$). The positive electrode potential can be made high by using these positive electrode active materials.

When a room temperature molten salt is used as the electrolyte of the battery, it is preferable to use a positive electrode active material including lithium iron phosphate, $Li_xVPO_4F$ ($0\leq x\leq1$), lithium manganese composite oxide, lithium nickel composite oxide, lithium nickel cobalt composite oxide, or a mixture thereof. Since these compounds have low reactivity with room temperature molten salts, cycle life can be improved. Details regarding the room temperature molten salt are described later.

The positive electrode active material may preferably have primary particle sizes in the range of 100 nm to 1 μm. The positive electrode active material having primary particle sizes of 100 nm or more may be easy to handle in industrial applications. The positive electrode active material having primary particle sizes of 1 μm or less may allow lithium ions to be smoothly diffused in solid.

The positive electrode active material may preferably have a specific surface area in the range of 0.1 $m^2/g$ to 10 $m^2/g$. The positive electrode active material having a specific surface area of 0.1 $m^2/g$ or more may secure an adequately large site for insertion and extraction of Li ions. The positive electrode active material having a specific surface area of 10 $m^2/g$ or less may be easy to handle in industrial applications and may ensure a favorable charge-and-discharge cycle.

The binder is blended in order to fill a gap between the dispersed positive electrode active materials and to bind the positive electrode active material and the positive electrode current collector. Examples of the binder include polytetrafluoroethylene (PTFE), polyvinylidene fluoride (PVdF), fluorine rubber, polyacrylic acid compounds, imide compounds, carboxy methyl cellulose (CMC), and salts of CMC. One of these may be used as the binder, or a combination of two or more thereof may be used as the binder.

A conductive agent is added in order to increase the current-collecting performance and suppress the contact resistance between the positive electrode active material and the positive electrode current collector. Examples of the conductive agent include carbonaceous materials such as vapor grown carbon fibers (VGCF), carbon black such as acetylene black, graphite, carbon nanofibers and carbon nanotubes. One of these materials may be used as the conductive agent, or two or more of these materials may be combined and used as the conductive agent. In addition, the conductive agent can be omitted.

In the positive electrode active material-containing layer, it is preferable to combine the positive electrode active material and the binder in a mass ratio of the positive electrode active material in a range from 80% to 98% and the binder in a range from 2% to 20%.

By making the amount of the binder be 2% by mass or greater, sufficient electrode strength is obtained. In addition, the binder may function as an insulator. For this reason, if the amount of the binder is kept at 20% by mass or less, the amount of insulation contained in the electrode is decreased, and therefore the internal resistance can be reduced.

In the case of adding the conductive agent, it is preferable to combine the positive electrode active material, the binder, and the conductive agent in a mass ratio of the positive electrode active material in a range from 77% to 95%, the binder in a range from 2% to 20%, and conductive agent in a range from 3% to 15%.

By making the amount of the conductive agent be 3% by mass or greater, the effects described above can be exhibited. Also, by keeping the amount of the conductive agent to 15% by mass or less, the proportion of the conductive agent in contact with electrolyte can be lowered. If this proportion is low, decomposition of the electrolyte under high-temperature storage can be reduced.

The positive electrode current collector is preferably an aluminum foil or an aluminum alloy foil containing one or more elements selected from Mg, Ti, Zn, Ni, Cr, Mn, Fe, Cu, and Si.

The thickness of the aluminum foil or aluminum alloy foil is preferably within a range from 5 μm to 20 μm, and is more preferably 15 μm or less. The purity of the aluminum foil is preferably 99% by mass or more. The content of transition metals such as iron, copper, nickel, and chromium contained in the aluminum foil or aluminum alloy foil is preferably 1% by mass or less.

In addition, the positive electrode current collector can include a portion where the positive electrode active material-containing layer is not formed on the surface thereof. This portion can serve as a positive electrode tab.

The positive electrode can be produced, for example, by the following method. First, an active material, a conductive agent, and a binder are suspended in a solvent to prepare a slurry. This slurry is applied to one side or both sides of the current collector. Next, the applied slurry is dried to obtain a laminate of the active material-containing layer and the current collector.

Thereafter, the laminate is pressed. The positive electrode is thus produced.

Alternatively, the positive electrode may be produced by the following method. First, an active material, a conductive agent, and a binder are mixed to obtain a mixture. The mixture is then formed into pellets.

Subsequently, these pellets can be arranged on the current collector to obtain a positive electrode.

(3) Separator

The separator is formed of, for example, a porous film containing polyethylene (polyethylene; PE), polypropylene (polypropylene; PP), cellulose, or polyvinylidene fluoride (PVdF), or a synthetic resin nonwoven fabric. From the viewpoint of safety, it is preferable to use a porous film formed from polyethylene or polypropylene. This is because these porous films can be melted at a predetermined temperature to interrupt the current.

As a separator, a solid electrolyte layer containing solid electrolyte particles can also be used. The solid electrolyte layer may contain one kind of solid electrolyte particles, or may contain a plurality of kinds of solid electrolyte particles. The solid electrolyte layer may be a solid electrolyte composite film containing solid electrolyte particles. The solid electrolyte composite film is, for example, formed by molding solid electrolyte particles into a film shape using a polymer material. The solid electrolyte layer may contain at least one selected from the group consisting of plasticizers and electrolyte salts. When the solid electrolyte layer contains an electrolyte salt, for example, the alkali metal ion conductivity of the solid electrolyte layer can be further enhanced.

Examples of the polymer material include polyether-based, polyester-based, polyamine-based, polyethylene-based, silicone-based and polysulfide-based polymer materials.

As the solid electrolyte, it is preferable to use an inorganic solid electrolyte. Examples of the inorganic solid electrolyte include an oxide-based solid electrolyte and a sulfide-based solid electrolyte. As the oxide-based solid electrolyte, it is preferable to use a lithium phosphate solid electrolyte having a NASICON type structure and represented by the general formula $LiM_2(PO_4)_3$. M in the above general formula is preferably at least one kind of element selected from the group consisting of titanium (Ti), germanium (Ge), strontium (Sr), zirconium (Zr), tin (Sn), and aluminum (Al). It is more preferable that the element M contain any one element of Ge, Zr and Ti, and Al.

Specific examples of the lithium phosphate solid electrolyte having a NASICON type structure can include LATP $(Li_{1+x}Al_xTi_{2-x}(PO_4)_3)$, $Li_{1+x}Al_xGe_{2-x}(PO_4)_3$, and $Li_{1+x}Al_xZr_{2-x}(PO_4)_3$. In the above formulae, x is in the range of $0<x\leq5$, preferably in the range of $0.1\leq x\leq0.5$. It is preferable to use LATP as the solid electrolyte. LATP has excellent water resistance and is less likely to cause hydrolysis in a secondary battery.

Further, as the oxide-based solid electrolyte, amorphous LIPON $(Li_{2.9}PO_{3.3}N_{0.46})$ or LLZ $(Li_7La_3Zr_2O_{12})$ having a garnet-type structure may be used.

According to the first embodiment, an electrode group is provided. The electrode group includes a positive electrode including a positive electrode current collector and a positive electrode active material-containing layer on the positive electrode current collector, and a negative electrode including a negative electrode current collector and a negative electrode active material-containing layer on the negative electrode current collector. The area of the orthogonal projection of the negative electrode active material-containing layer to the negative electrode current collector is larger than the area of the orthogonal projection of the positive electrode active material-containing layer to the positive electrode current collector. The negative electrode active material-containing layer includes a facing section which faces the positive electrode active material-containing layer and a non-facing section which does not face the positive electrode active material-containing layer. A first fluorine-containing coating is formed on a main surface of the negative electrode active material-containing layer in at least a part of the non-facing section. The abundance ratio of fluorine atoms included in the first fluorine-containing coating is in the range of 2.5 atom % to 10 atom %. The electrode group can not only suppress self-discharge but also demonstrate excellent cycle life characteristics.

Second Embodiment

According to a second embodiment, there is provided a secondary battery including the electrode group according to the first embodiment, and an electrolyte. The secondary battery may be, for example, a lithium ion secondary battery. The secondary battery may be a nonaqueous electrolyte secondary battery including a nonaqueous electrolyte.

The secondary battery can further include a container member which stores the electrode group and electrolyte. The electrolyte can be held in the electrode group. The electrolyte can be held, for example, by the negative electrode active material-containing layer, the positive electrode active material-containing layer, and the separator, and between these layers.

The secondary battery can further include a negative electrode terminal electrically connected to the negative electrode, and a positive electrode terminal electrically connected to the positive electrode.

Hereinafter, the negative electrode, positive electrode, separator, electrolyte, container member, negative electrode terminal and positive electrode terminal will be described in detail.

(1) Negative Electrode

The negative electrode, which the secondary battery according to the second embodiment includes, may be, for example, the negative electrode described in the first embodiment.

(2) Positive Electrode

The positive electrode, which the secondary battery according to the second embodiment includes, may be, for example, the positive electrode described in the first embodiment.

(3) Separator

The separator, which the secondary battery according to the second embodiment includes, may be, for example, the separator described in the first embodiment.

(4) Electrolyte

As the electrolyte, for example, a liquid nonaqueous electrolyte or gel nonaqueous electrolyte may be used. The liquid nonaqueous electrolyte is prepared by dissolving an electrolyte salt as solute in an organic solvent. The concentration of electrolyte salt is preferably from 0.5 mol/L to 2.5 mol/L.

Examples of the electrolyte salt include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$), and lithium bistrifluoromethylsulfonylimide [$LiN(CF_3SO_2)_2$], and mixtures thereof. The electrolyte salt is preferably resistant to oxidation even at a high potential, and most preferably $LiPF_6$.

Examples of the organic solvent include cyclic carbonates such as propylene carbonate (PC), ethylene carbonate (EC), or vinylene carbonate (VC); linear carbonates such as diethyl carbonate (DEC), dimethyl carbonate (DMC), or methyl ethyl carbonate (MEC); cyclic ethers such as tetrahydrofuran (THF), 2-methyl tetrahydrofuran (2-MeTHF), or dioxolane (DOX); linear ethers such as dimethoxy ethane (DME) or diethoxy ethane (DEE); γ-butyrolactone (GEL), acetonitrile (AN), and sulfolane (SL). These organic solvents may be used singularly or as a mixed solvent.

The gel nonaqueous electrolyte is prepared by obtaining a composite of a liquid nonaqueous electrolyte and a polymeric material. Examples of the polymeric material include polyvinylidene fluoride (PVdF), polyacrylonitrile (PAN), polyethylene oxide (PEO), and mixtures thereof.

Alternatively, other than the liquid nonaqueous electrolyte and gel nonaqueous electrolyte, a room temperature molten salt (ionic melt) including lithium ions, a polymer solid electrolyte, an inorganic solid electrolyte, or the like may be used as the nonaqueous electrolyte.

The room temperature molten salt (ionic melt) indicates compounds among organic salts made of combinations of organic cations and anions, which are able to exist in a liquid state at room temperature (15° C. to 25° C.). The room temperature molten salt includes a room temperature molten salt which exists alone as a liquid, a room temperature molten salt which becomes a liquid upon mixing with an electrolyte salt, a room temperature molten salt which becomes a liquid when dissolved in an organic solvent, and mixtures thereof. In general, the melting point of the room temperature molten salt used in secondary batteries is 25° C. or below. The organic cations generally have a quaternary ammonium framework.

The polymer solid electrolyte is prepared by dissolving the electrolyte salt in a polymeric material, and solidifying it.

The inorganic solid electrolyte is a solid substance having Li ion conductivity.

The electrolyte may also be an aqueous electrolyte containing water.

The aqueous electrolyte includes an aqueous solvent and an electrolyte salt. The aqueous electrolyte is liquid, for example. A liquid aqueous electrolyte is an aqueous solution prepared by dissolving an electrolyte salt as the solute in an aqueous solvent. The aqueous solvent is a solvent containing 50% or more water by volume, for example. The aqueous solvent may also be pure water.

The aqueous electrolyte may also be an aqueous gel composite electrolyte containing an aqueous electrolytic solution and a polymer material. The polymer material may be, for example, polyvinylidene fluoride (PVDF), polyacrylonitrile (PAN), or polyethylene oxide (PEO).

The aqueous electrolyte preferably contains 1 mol or greater of aqueous solvent per 1 mol of the salt as the solute. In an even more preferably aspect, the aqueous electrolyte contains 3.5 mol or greater of aqueous solvent per 1 mol of the salt as the solute.

That the aqueous electrolyte contains water can be confirmed by gas chromatography-mass spectrometry (GC-MS) measurement. Also, the salt concentration and the amount of water contained in the aqueous electrolyte can be computed by measurement using inductively coupled plasma (ICP) emission spectroscopy or the like, for example. By measuring out a prescribed amount of the aqueous electrolyte and computing the contained salt concentration, the molar concentration (mol/L) can be computed. Also, by measuring the specific gravity of the aqueous electrolyte, the number of moles of the solute and the solvent can be computed.

The aqueous electrolyte is prepared by dissolving the electrolyte salt into the aqueous solvent at a concentration from 1 to 12 mol/L for example.

To suppress electrolysis of the aqueous electrolyte, LiOH, $Li_2SO_4$, or the like can be added to adjust the pH. The pH is preferably from 3 to 13, and more preferably from 4 to 12.

(5) Container Member

As the container member, for example, a container made of laminate film or a container made of metal may be used.

The thickness of the laminate film is, for example, 0.5 mm or less, and preferably 0.2 mm or less.

As the laminate film, used is a multilayer film including multiple resin layers and a metal layer sandwiched between the resin layers. The resin layer may include, for example, a polymeric material such as polypropylene (PP), polyethylene (PE), nylon, or polyethylene terephthalate (PET). The metal layer is preferably made of aluminum foil or an aluminum alloy foil, so as to reduce weight. The laminate film may be formed into the shape of a container member, by heat-sealing.

The wall thickness of the metal container is, for example, 1 mm or less, more preferably 0.5 mm or less, and still more preferably 0.2 mm or less.

The metal case is made, for example, of aluminum or an aluminum alloy. The aluminum alloy preferably contains elements such as magnesium, zinc, or silicon. If the aluminum alloy contains a transition metal such as iron, copper, nickel, or chromium, the content thereof is preferably 100 ppm by mass or less.

The shape of the container member is not particularly limited. The shape of the container member may be, for example, flat (thin), square, cylinder, coin, or button-shaped. The container member may be appropriately selected depending on battery size and use of the battery.

(6) Negative Electrode Terminal

The negative electrode terminal may be made of a material that is electrochemically stable at the potential at which Li is inserted into and extracted from the above-described negative electrode active material, and has electrical conductivity. Specific examples of the material for the negative electrode terminal include copper, nickel, stainless steel, aluminum, and aluminum alloy containing at least one element selected from the group consisting of Mg, Ti, Zn, Mn, Fe, Cu, and Si. Aluminum or aluminum alloy is preferred as the material for the negative electrode terminal. The negative electrode terminal is preferably made of the same material as the negative electrode current collector, in order to reduce the contact resistance with the negative electrode current collector.

(7) Positive Electrode Terminal

The positive electrode terminal may be made of, for example, a material that is electrically stable in the potential range of 3 V to 5 V (vs. Li/Li$^+$) relative to the redox potential of lithium, and has electrical conductivity. Examples of the material for the positive electrode terminal include aluminum and an aluminum alloy containing one or more selected from the group consisting of Mg, Ti, Zn, Mn, Fe, Cu, and Si. The positive electrode terminal is preferably made of the same material as the positive electrode current collector, in order to reduce contact resistance with the positive electrode current collector.

Next, the secondary battery according to the second embodiment will be more specifically described with reference to the drawings.

Figure 5:
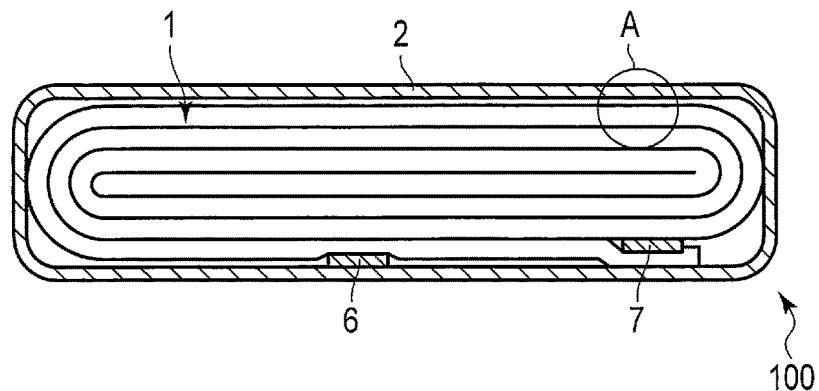
FIG. 5 is a cross-sectional view schematically showing an example of a secondary battery according to an embodiment.
Figure 6:
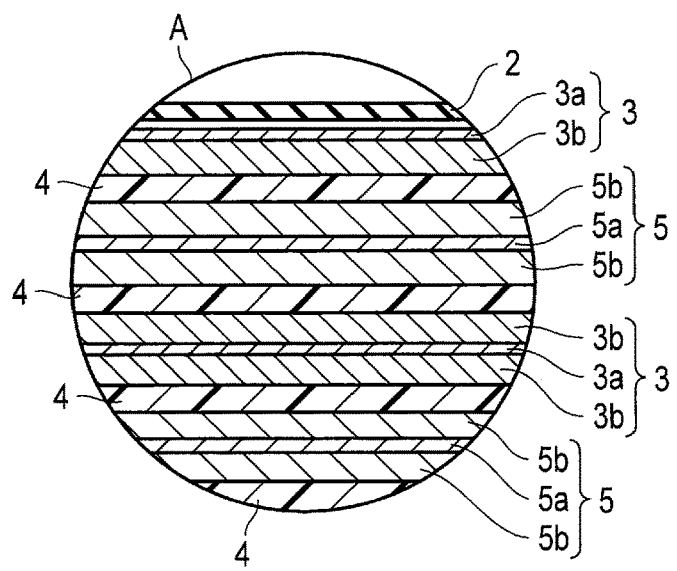
FIG. 6 is an enlarged cross-sectional view of section A of the secondary battery shown in FIG. 5.

FIG. 5 is a cross-sectional view schematically showing an example of a secondary battery according to the second embodiment. FIG. 6 is an enlarged cross-sectional view of section A of the secondary battery shown in FIG. 5.

The secondary battery 100 shown in FIGS. 5 and 6 includes a bag-shaped container member 2 and an electrode group 1, and an electrolyte, which is not shown. The electrode group 1 and the electrolyte are housed in the bag-shaped container member 2. The electrolyte (not shown) is held in the electrode group 1.

The bag-shaped container member 2 is made of a laminate film including two resin layers and a metal layer sandwiched between the resin layers.

As shown in FIG. 5, the electrode group 1 is a wound electrode group in a flat form. The wound electrode group 1 in a flat form includes a negative electrode 3, a separator 4, and a positive electrode 5, as shown in FIG. 6. The separator 4 is sandwiched between the negative electrode 3 and the positive electrode 5.

The negative electrode 3 includes a negative electrode current collector 3a and a negative electrode active material-containing layer 3b. At the portion of the negative electrode 3 positioned outermost among the wound electrode group 1, the negative electrode active material-containing layer 3b is formed only on an inner surface of the negative electrode current collector 3a, as shown in FIG. 6. For the other portions of the negative electrode 3, negative electrode active material-containing layers 3b are formed on both of reverse surfaces of the negative electrode current collector 3a.

The positive electrode 5 includes a positive electrode current collector 5a and positive electrode active material-containing layers 5b formed on both of reverse surfaces of the positive electrode current collector 5a.

As shown in FIG. 5, a negative electrode terminal 6 and positive electrode terminal 7 are positioned in vicinity of the outer peripheral edge of the wound electrode group 1. The negative electrode terminal 6 is connected to a portion of the negative electrode current collector 3a positioned outermost. The positive electrode terminal 7 is connected to a portion of the positive electrode current collector 5a positioned outermost. The negative electrode terminal 6 and the positive electrode terminal 7 extend out from an opening of the bag-shaped container member 2. A thermoplastic resin layer is provided on the inner surface of the bag-shaped container member 2, and the opening is sealed by heat-sealing the resin layer.

Figure 7:
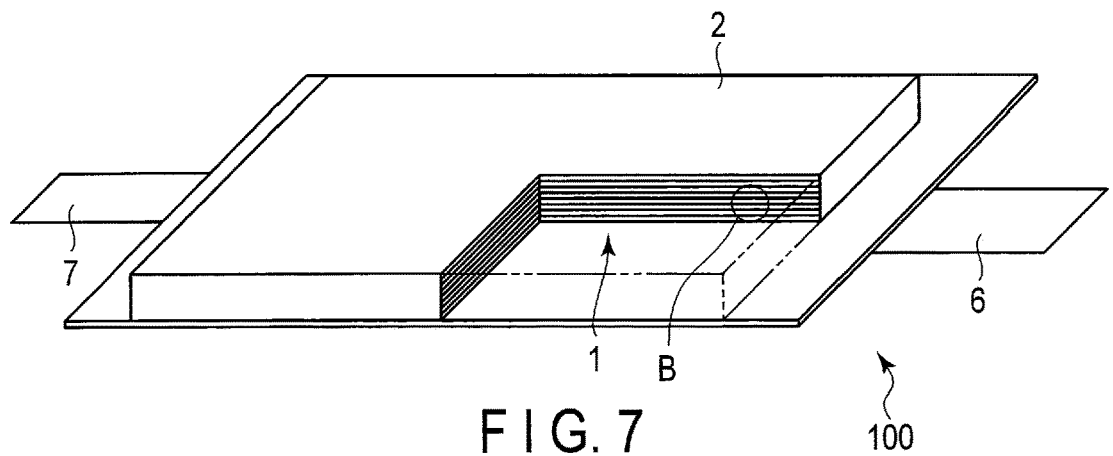
FIG. 7 is a partially cut-out perspective view schematically showing another example of the secondary battery according to the embodiment.
Figure 8:
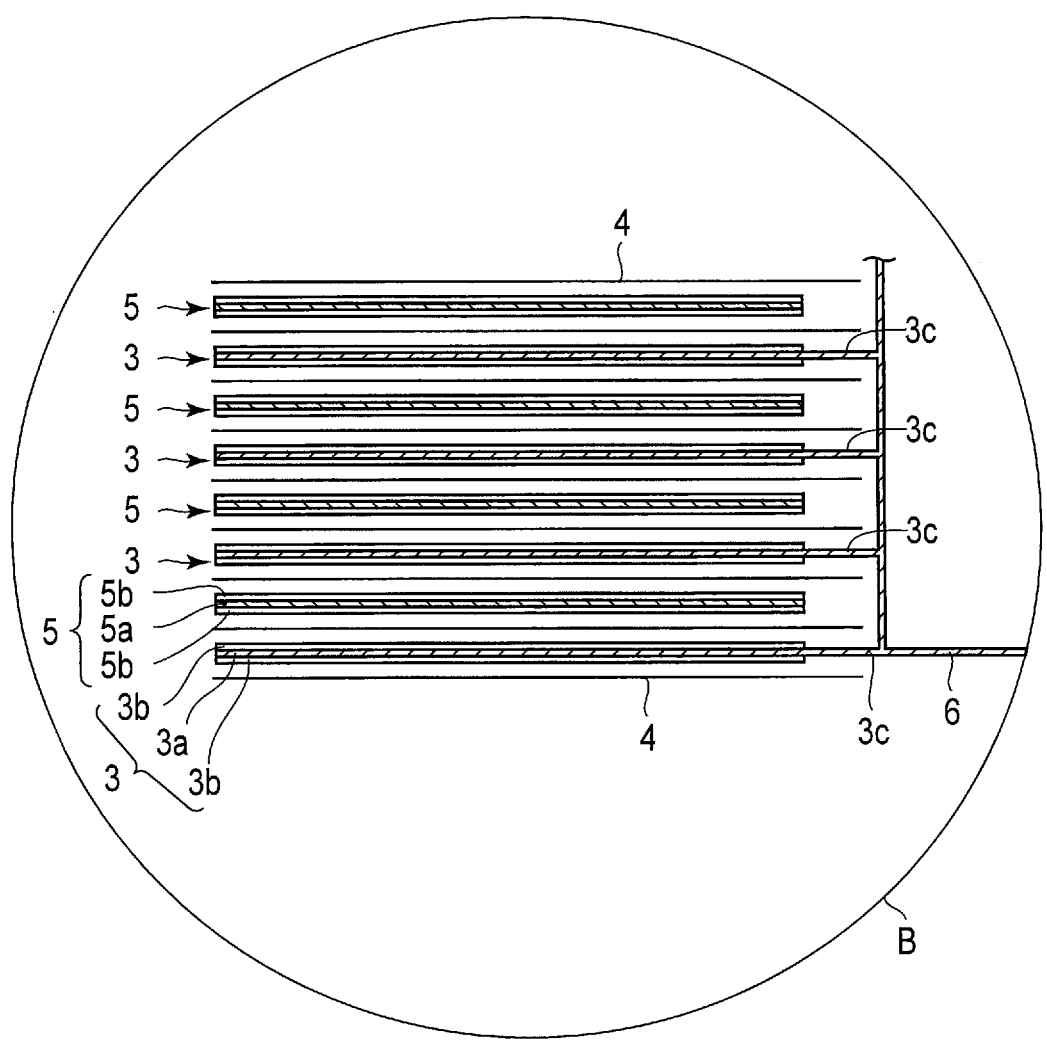
FIG. 8 is an enlarged cross-sectional view of section B of the secondary battery shown in FIG. 7.

The secondary battery according to the second embodiment is not limited to the secondary battery of the structure shown in FIGS. 5 and 6, and may be, for example, a battery of a structure as shown in FIGS. 7 and 8.

FIG. 7 is a partially cut-out perspective view schematically showing another example of a secondary battery according to the third embodiment. FIG. 8 is an enlarged cross-sectional view of section B of the secondary battery shown in FIG. 7.

The secondary battery 100 shown in FIGS. 7 and 8 includes an electrode group 1 shown in FIGS. 7 and 8, a container member 2 shown in FIG. 7, and an electrolyte, which is not shown. The electrode group 1 and the electrolyte are housed in the container member 2. The electrolyte is held in the electrode group 1.

The container member 2 is made of a laminate film including two resin layers and a metal layer sandwiched between the resin layers.

As shown in FIG. 8, the electrode group 1 is a stacked electrode group. The stacked electrode group 1 has a structure in which and negative electrodes 3 and positive electrodes 5 are alternately stacked with separator(s) 4 sandwiched therebetween.

The electrode group 1 includes plural negative electrodes 3. Each of the negative electrodes 3 includes the negative electrode current collector 3a and the negative electrode active material-containing layers 3b supported on both surfaces of the negative electrode current collector 3a. The electrode group 1 further includes plural positive electrodes 5. Each of the positive electrodes 5 includes the positive electrode current collector 5a and the positive electrode active material-containing layers 5b supported on both surfaces of the positive electrode current collector 5a.

The negative electrode current collector 3a of each of the negative electrodes 3 includes at one end, a portion 3c where the negative electrode active material-containing layer 3b is not supported on either surface. This portion 3c serves as a negative electrode tab. As shown in FIG. 6, the portions 3c serving as the negative electrode tabs do not overlap the positive electrodes 5. The plural negative electrode tabs (portions 3c) are electrically connected to the strip-shaped negative electrode terminal 6. A tip of the strip-shaped negative electrode terminal 6 is drawn to the outside from the container member 2.

Although not shown, the positive electrode current collector 5a of each of the positive electrodes 5 includes at one end, a portion where the positive electrode active material-containing layer 5b is not supported on either surface. This portion serves as a positive electrode tab. Like the negative electrode tabs (portion 3c), the positive electrode tabs do not overlap the negative electrodes 3. Further, the positive electrode tabs are located on the opposite side of the electrode group 1 with respect to the negative electrode tabs (portion 3c). The positive electrode tabs are electrically connected to the strip-shaped positive electrode terminal 7. A tip of the strip-shaped positive electrode terminal 7 is located on the opposite side relative to the negative electrode terminal 6 and drawn to the outside from the container member 2.

The secondary battery according to the second embodiment includes the electrode group according to the first embodiment. Thus, the secondary battery can not only suppress self-discharge but also demonstrate excellent cycle life characteristics.

Third Embodiment

According to a third embodiment, a battery module is provided. The battery module according to the third embodiment includes plural secondary batteries according to the second embodiment.

In the battery module according to the third embodiment, each of the single batteries may be arranged electrically connected in series, in parallel, or in a combination of in-series connection and in-parallel connection.

An example of the battery module according to the third embodiment will be described next with reference to the drawings.

Figure 9:
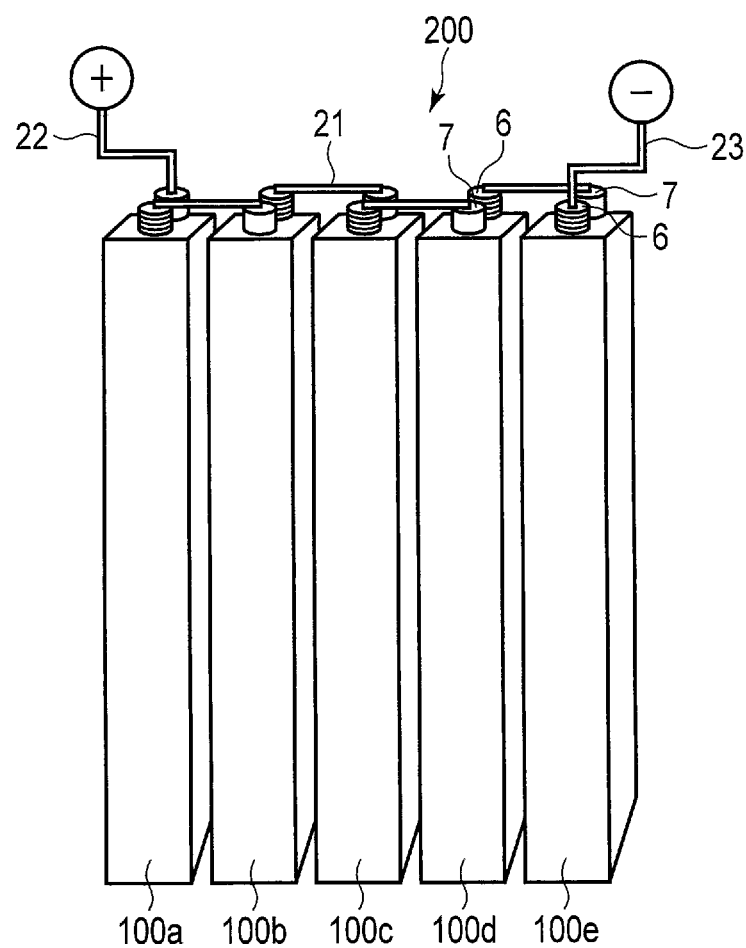
FIG. 9 is a perspective view schematically showing an example of a battery module according to an embodiment.

FIG. 9 is a perspective view schematically showing an example of the battery module according to the third embodiment. A battery module 200 shown in FIG. 9 includes five single-batteries 100a to 100e, four bus bars 21, a positive electrode-side lead 22, and a negative electrode-side lead 23. Each of the five single-batteries 100a to 100e is a secondary battery according to the second embodiment.

The bus bars 21 connects a negative electrode terminal 6 of a single unit cell 100a to a positive electrode terminal 7 of an adjacently positioned unit cell 100b. In this way, the five unit cells 100a to 100e are connected in series by the four bus bars 21. That is, the battery module 200 shown in FIG. 9 is a battery module of five in-series connection. Although an example is not illustrated, in a battery module containing a plurality of unit cells electrically connected in parallel, the plurality of unit cells may be electrically connected by connecting the plurality of negative electrode terminals to each other with busbars and also connecting the plurality of positive electrode terminals to each other with busbars, for example.

The positive electrode terminal 7 of at least one battery among the five unit cells 100a to 100e is electrically connected to a positive electrode lead 22 for external connection. Also, the negative electrode terminal 6 of at least one battery among the five unit cells 100a to 100e is electrically connected to a negative electrode lead 23 for external connection.

The battery module according to the third embodiment includes the secondary battery according to the second embodiment. Thus, the battery module can not only suppress self-discharge but also demonstrate excellent cycle life characteristics.

Fourth Embodiment

According to the fourth embodiment, a battery pack is provided. The battery pack includes the battery module according to the third embodiment. The battery pack may also be equipped with a single secondary battery according to the second embodiment instead of the battery module according to the third embodiment.

The battery pack according to the fourth embodiment may further include a protective circuit. The protective circuit has a function to control charging and discharging of the secondary battery. Alternatively, a circuit included in equipment where the battery pack serves as a power source (for example, electronic devices, vehicles, and the like) may be used as the protective circuit for the battery pack.

Moreover, the battery pack according to the fourth embodiment may further include an external power distribution terminal. The external power distribution terminal is configured to externally output current from the secondary battery, and to input external current into the secondary battery. In other words, when the battery pack is used as a power source, the current is provided out via the external power distribution terminal. When the battery pack is charged, the charging current (including regenerative energy of a motive force of vehicles such as automobiles) is provided to the battery pack via the external power distribution terminal.

Next, an example of a battery pack according to the fourth embodiment will be described with reference to the drawings.

Figure 10:
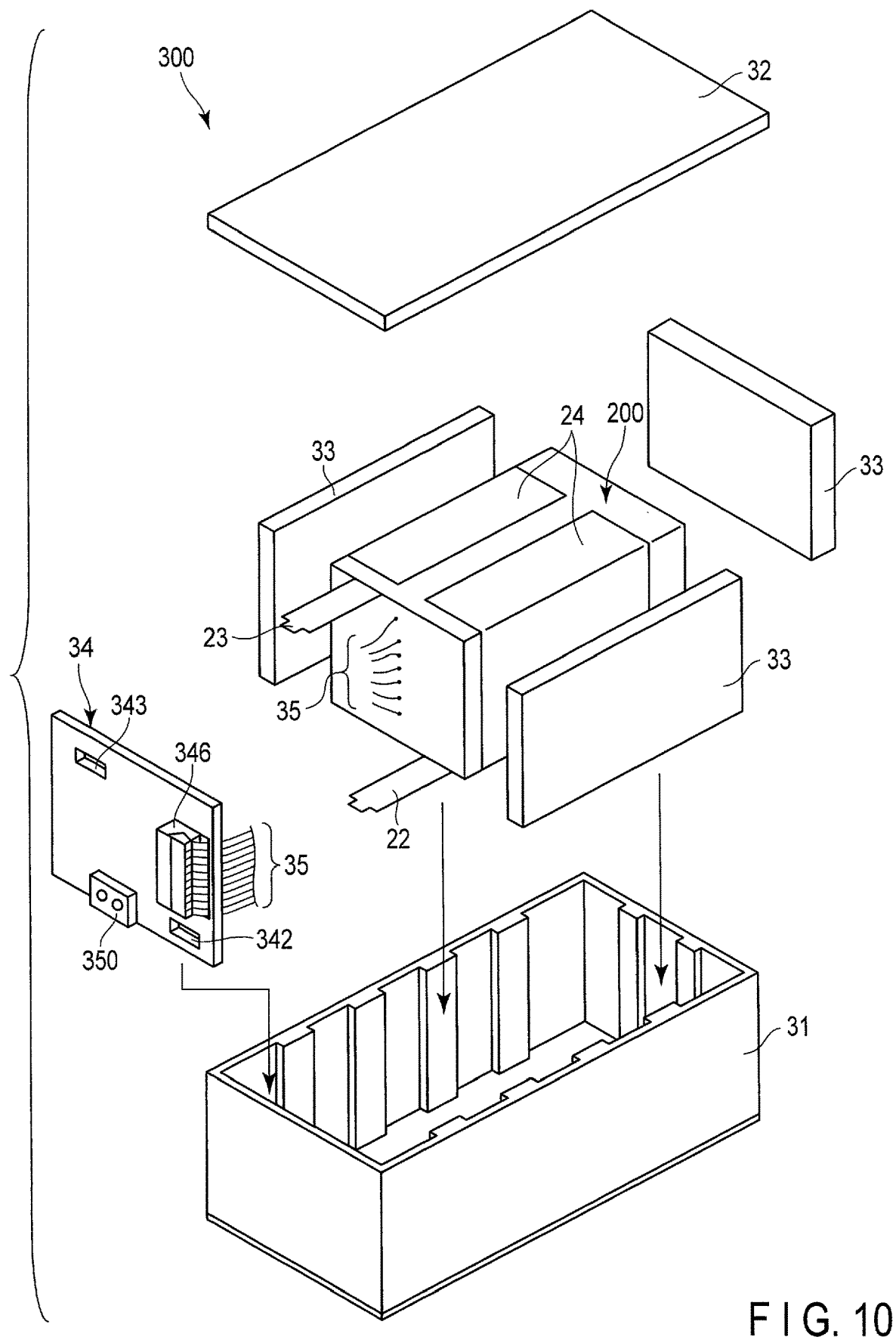
FIG. 10 is an exploded perspective view schematically showing an example of a battery pack according to an embodiment.
Figure 11:
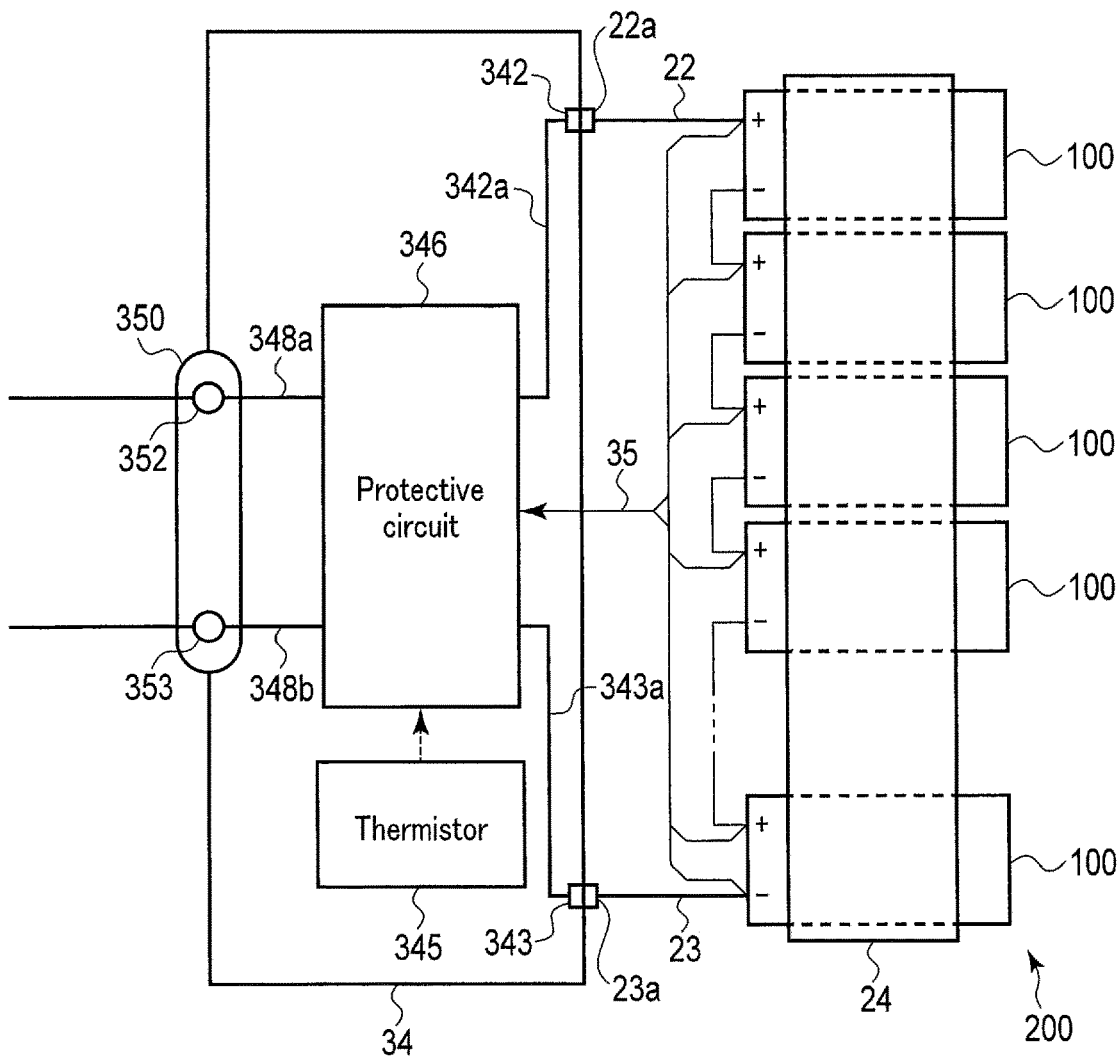
FIG. 11 is a block diagram showing an example of an electric circuit of the battery pack shown in FIG. 10.

FIG. 10 is an exploded perspective view schematically showing an example of the battery pack according to the fourth embodiment. FIG. 11 is a block diagram showing an example of an electric circuit of the battery pack shown in FIG. 10.

A battery pack 300 shown in FIGS. 10 and 11 includes a housing container 31, a lid 32, protective sheets 33, a battery module 200, a printed wiring board 34, wires 35, and an insulating plate (not shown).

A housing container 31 shown in FIG. 10 is a bottomed-square-shaped container having a rectangular bottom surface. The housing container 31 is configured to house protective sheet 33, a battery module 200, a printed wiring board 34, and wires 35. A lid 32 has a rectangular shape. The lid 32 covers the housing container 31 to house the battery module 200 and the like. Although not shown, opening(s) or connection terminal(s) for connecting to external device(s) and the like are provided on the housing container 31 and lid 32.

The battery module 200 includes plural unit cells 100, a positive electrode-side lead 22, a negative electrode-side lead 23, and an adhesive tape 24.

At least one in the plurality of unit cells 100 is a secondary battery according to the second embodiment. Each unit cell 100 in the plurality of unit cells 100 is electrically connected in series, as shown in FIG. 11. The plurality of unit cells 100 may alternatively be electrically connected in parallel, or connected in a combination of in-series connection and in-parallel connection. If the plurality of unit cells 100 is connected in parallel, the battery capacity increases as compared to a case where they are connected in series.

The adhesive tape 24 fastens the plural unit cells 100. The plural unit cells 100 may be fixed using a heat-shrinkable tape in place of the adhesive tape 24. In this case, the protective sheets 33 are arranged on both side surfaces of the battery module 200, and the heat-shrinkable tape is wound around the battery module 200 and protective sheets 33. After that, the heat-shrinkable tape is shrunk by heating to bundle the plural unit cells 100.

One terminal of a positive electrode lead 22 is connected to a battery module 200. One terminal of the positive electrode lead 22 is electrically connected to the positive electrode of one or more unit cells 100. One terminal of a negative electrode lead 23 is connected to the battery module 200. One terminal of the negative electrode lead 23 is electrically connected to the negative electrode of one or more unit cells 100.

The printed wiring board 34 is arranged on the inner surface of the housing container 31 along the short side direction. The printed wiring board 34 includes a positive electrode connector 342, a negative electrode connector 343, a thermistor 345, a protective circuit 346, wirings 342a and 343a, an external power distribution terminal 350, a plus-side wire (positive-side wire) 348a, and a minus-side wire (negative-side wire) 348b. One principal surface of the printed wiring board 34 faces one side surface of the battery module 200. An insulating plate (not shown) is disposed in between the printed wiring board 34 and the battery module 200.

The other terminal 22a of the positive electrode lead 22 is electrically connected to a positive electrode connector 342. The other terminal 23a of the negative electrode lead 23 is electrically connected to a negative electrode connector 343.

The thermistor 345 is fixed to one principal surface of the printed wiring board 34. The thermistor 345 detects the temperature of each unit cell 100 and transmits detection signals to the protective circuit 346.

The external power distribution terminal 350 is fixed to the other principal surface of the printed wiring board 34. The external power distribution terminal 350 is electrically connected to device(s) that exists outside the battery pack 300. The external power distribution terminal 350 includes a positive side terminal 352 and a negative side terminal 353.

The protective circuit 346 is fixed to the other principal surface of the printed wiring board 34. The protective circuit 346 is connected to the positive side terminal 352 via the plus-side wire 348a. The protective circuit 346 is connected to the negative side terminal 353 via the minus-side wire 348b. In addition, the protective circuit 346 is electrically connected to the positive electrode connector 342 via the wiring 342a. The protective circuit 346 is electrically connected to the negative electrode connector 343 via the wiring 343a. Furthermore, the protective circuit 346 is electrically connected to each unit cell 100 in the plurality of unit cells 100 via the wires 35.

The protective sheets 33 are arranged on both inner surfaces of the housing container 31 along the long side direction and on one inner surface of the housing container 31 along the short side direction facing the printed wiring board 34 through the battery module 200. The protective sheet 33 is made of, for example, resin or rubber.

The protective circuit 346 controls charging and discharging of the plurality of unit cells 100. The protective circuit 346 is also configured to cut off electric connection between the protective circuit 346 and the external power distribution terminal 350 (the positive side terminal 352 and the negative side terminal 353) to the external devices, based on detection signals transmitted from the thermistor 345 or detection signals transmitted from each unit cell 100 or the battery module 200.

An example of the detection signal transmitted from the thermistor 345 is a signal indicating that the temperature of the unit cell(s) 100 is detected to be a predetermined temperature or more. An example of the detection signal transmitted from each unit cell 100 or the battery module 200 is a signal indicating detection of over-charge, over-discharge, and overcurrent of the unit cell(s) 100. When detecting over-charge or the like for each of the unit cells 100, the battery voltage may be detected, or a positive electrode potential or negative electrode potential may be detected. In the latter case, a lithium electrode to be used as a reference electrode may be inserted into each unit cell 100.

Note, that as the protective circuit 346, a circuit included in a device (for example, an electronic device or an automobile) that uses the battery pack 300 as a power source may be used.

As described above, the battery pack 300 includes the external power distribution terminal 350. Hence, the battery pack 300 can output current from the battery module 200 to an external device and input current from an external device to the battery module 200 via the external power distribution terminal 350. In other words, when using the battery pack 300 as a power source, the current from the battery module 200 is supplied to an external device via the external power distribution terminal 350. When charging the battery pack 300, a charge current from an external device is supplied to the battery pack 300 via the external power distribution terminal 350. If the battery pack 300 is used as an onboard battery, the regenerative energy of the motive force of a vehicle can be used as the charge current from the external device.

Note that the battery pack 300 may include a plurality of battery modules 200. In this case, the plurality of battery modules 200 may be connected in series, in parallel, or connected in a combination of in-series connection and in-parallel connection. The printed wiring board 34 and the wires 35 may be omitted. In this case, the positive electrode lead 22 and the negative electrode lead 23 may be used as the positive side terminal and the negative side terminal of the external power distribution terminal, respectively.

Such a battery pack is used for, for example, an application required to have the excellent cycle performance when a large current is taken out. More specifically, the battery pack is used as, for example, a power source for electronic devices, a stationary battery, or an onboard battery for various kinds of vehicles. An example of the electronic device is a digital camera. The battery pack is particularly favorably used as an onboard battery.

The battery pack according to the fourth embodiment includes the secondary battery according to the second embodiment or the battery module according to the third embodiment. Thus, the battery pack can not only suppress self-discharge but also demonstrate excellent cycle life characteristics.

Fifth Embodiment

According to the fifth embodiment, a vehicle is provided. The vehicle includes the battery pack according to the fourth embodiment.

In a vehicle according to the fifth embodiment, the battery pack is configured, for example, to recover regenerative energy from motive force of the vehicle. The vehicle may include a mechanism configured to convert kinetic energy of the vehicle into regenerative energy.

Examples of the vehicle according to the fifth embodiment include two- to four-wheeled hybrid electric automobiles, two- to four-wheeled electric automobiles, electric assist bicycles, and railway cars.

In the vehicle, the installing position of the battery pack is not particularly limited. For example, the battery pack may be installed in the engine compartment of the vehicle, in rear parts of the vehicle, or under seats.

A plurality of battery packs is loaded on the vehicle. In this case, the batteries included in each of the battery packs may be electrically connected to each other in series, in parallel, or in a combination of in-series connection and in-parallel connection. For example, in the case where each battery pack includes a battery module, the battery modules may be electrically connected to each other in series, in parallel, or in a combination of in-series connection and in-parallel connection. Alternatively, in the case where each battery pack includes a single battery, each of the batteries may be electrically connected to each other in series, in parallel, or in a combination of in-series connection and in-parallel connection.

Next, one example of the vehicle according to the fifth embodiment will be described with reference to the drawings.

Figure 12:
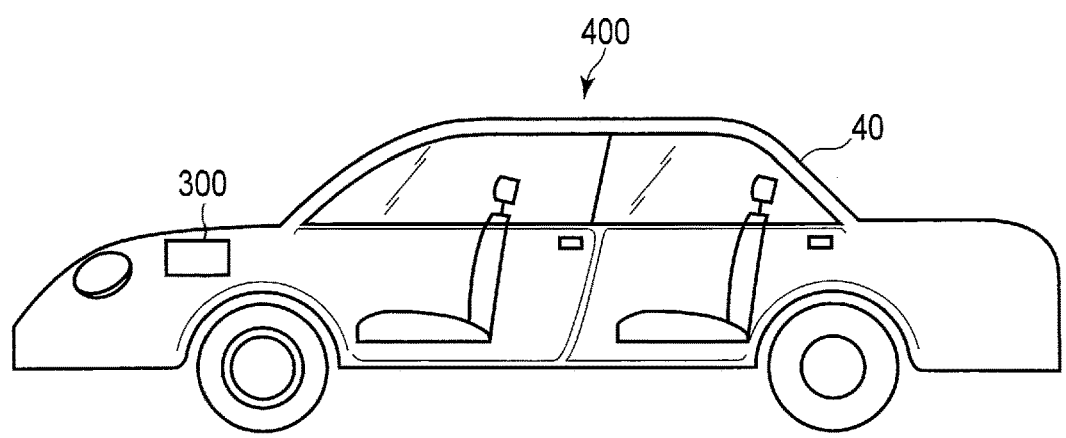
FIG. 12 is a partial perspective view schematically showing an example of a vehicle according to an embodiment.

FIG. 12 is a partially transparent diagram schematically illustrating one example of a vehicle according to the embodiment.

A vehicle 400 illustrated in FIG. 12 includes a vehicle body 40 and a battery pack 300 according to the embodiment. In the example illustrated in FIG. 12, the vehicle 400 is a four-wheeled automobile.

A plurality of the battery packs 300 may be loaded on the vehicle 400. In this case, the batteries included in the battery packs 300 (for example, unit cell or battery modules) may be connected in series, connected in parallel, or connected in a combination of in-series connection and in-parallel connection.

In FIG. 12, the battery pack 300 is installed in an engine compartment located at the front of the vehicle body 40. As described above, the battery pack 300 may be installed in rear sections of the vehicle body 40, or under a seat. The battery pack 300 may be used as a power source of the vehicle 400. In addition, the battery pack 300 can recover regenerative energy of a motive force of the vehicle 400.

Next, an embodiment of the vehicle according to the fifth embodiment will be described with reference to FIG. 13.

Figure 13:
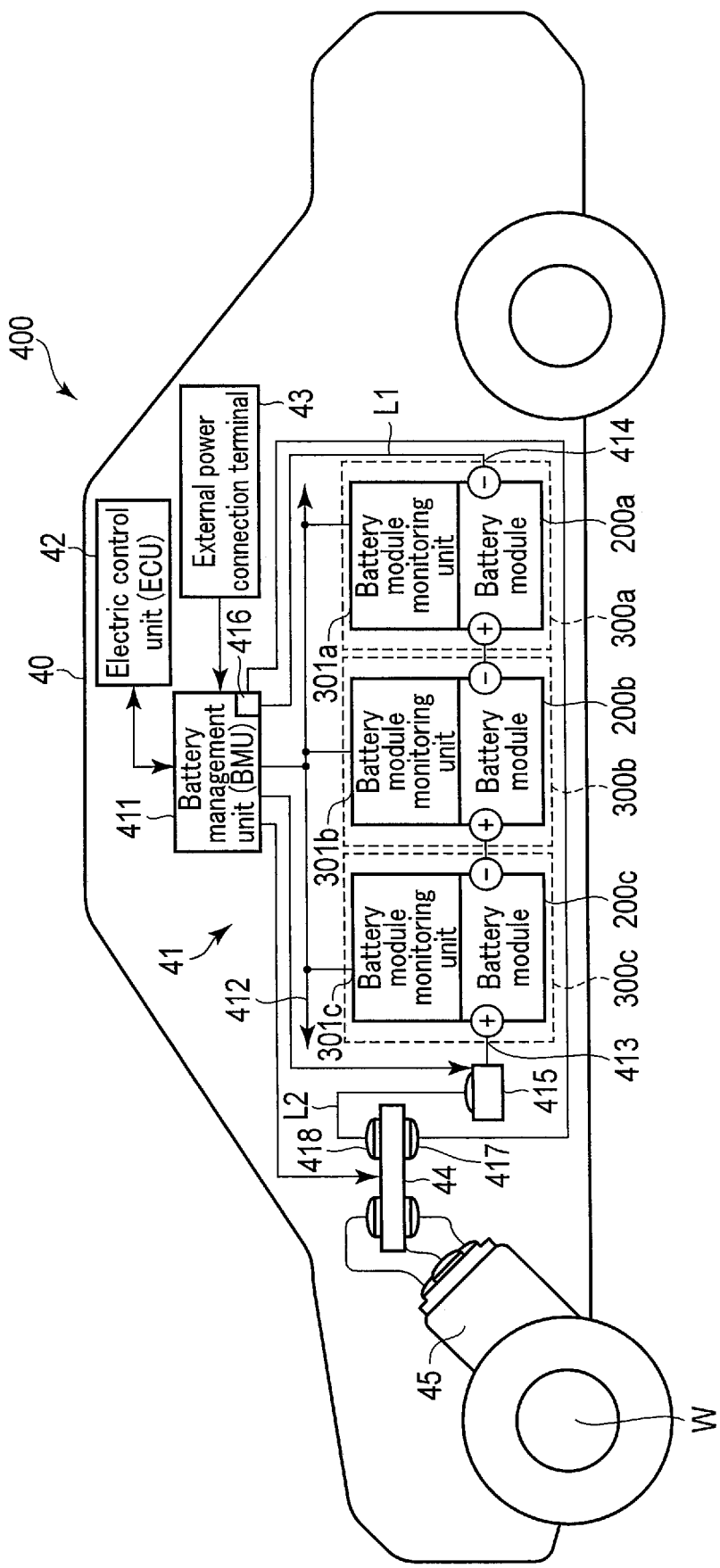
FIG. 13 is a diagram schematically showing an example of a control system related to an electric system in the vehicle according to the embodiment.

FIG. 13 is a diagram schematically illustrating one example of a control system related to an electrical system in the vehicle according to the fifth embodiment.

The vehicle 400 illustrated in FIG. 13 is an electric automobile.

The vehicle 400, shown in FIG. 13, includes a vehicle body 40, a vehicle power source 41, a vehicle ECU (electric control unit) 42, which is a master controller of the vehicle power source 41, an external terminal (an external power connection terminal) 43, an inverter 44, and a drive motor 45.

The vehicle 400 includes the vehicle power source 41, for example, in the engine compartment, in the rear sections of the automobile body, or under a seat. In FIG. 13, the position of the vehicle power source 41 installed in the vehicle 400 is schematically shown.

The vehicle power source 41 includes plural (for example, three) battery packs 300a, 300b and 300c, a battery management unit (BMU) 411, and a communication bus 412.

A battery pack 300a is provided with a battery module 200a and a battery module monitoring apparatus 301a (for example, voltage temperature monitoring (VTM)). A battery pack 300b is provided with a battery module 200b and a battery module monitoring apparatus 301b. A battery pack 300c is provided with a battery module 200c and a battery module monitoring apparatus 301c. The battery packs 300a to 300c are battery packs similar to the battery pack 300 described earlier, and the battery modules 200a to 200c are battery modules similar to the battery module 200 described earlier. The battery modules 200a to 200c are electrically connected in series. The battery packs 300a, 300b, and 300c are removable independently of each other, and each can be replaced with a different battery pack 300.

Each of the battery modules 200a to 200c includes plural battery cells connected in series. At least one of the plural battery cells is the secondary battery according to the second embodiment. The battery modules 200a to 200c each perform charging and discharging via a positive electrode terminal 413 and a negative electrode terminal 414.

A battery management apparatus 411 communicates with the battery module monitoring apparatus 301a to 301c, and collects information related to the voltage, temperature, and the like for each of the unit cells 100 included in the battery modules 200a to 200c included in the vehicle power source 41. With this arrangement, the battery management apparatus 411 collects information related to the maintenance of the vehicle power source 41.

The battery management apparatus 411 and the battery module monitoring apparatus 301a to 301c are connected via a communication bus 412. In the communication bus 412, a set of communication wires are shared with a plurality of nodes (the battery management apparatus 411 and one or more of the battery module monitoring apparatus 301a to 301c). The communication bus 412 is a communication bus, for example, configured in accordance with the controller area network (CAN) standard.

The battery module monitoring units 301a to 301c measure a voltage and a temperature of each battery cell in the battery modules 200a to 200c based on commands from the battery management unit 411. It is possible, however, to measure the temperatures only at several points per battery module, and the temperatures of all of the battery cells need not be measured.

The vehicle power source 41 can also have an electromagnetic contactor (for example, a switch apparatus 415 illustrated in FIG. 13) that switches the presence or absence of an electrical connection between a positive electrode terminal 413 and a negative electrode terminal 414. The switch apparatus 415 includes a pre-charge switch (not illustrated) that turns on when the battery modules 200a to 200c are charged, and a main switch (not illustrated) that turns on when the output from the battery modules 200a to 200c is supplied to the load. Each of the pre-charge switch and the main switch is provided with a relay circuit (not illustrated) that switches on or off according to a signal supplied to a coil disposed near a switching element. The electromagnetic contactor such as the switch apparatus 415 is controlled according to of control signals from the battery management apparatus 411 or the vehicle ECU 42 that controls the entire operation of the vehicle 400.

The inverter 44 converts an inputted direct current voltage to a three-phase alternate current (AC) high voltage for driving a motor. Three-phase output terminal(s) of the inverter 44 is (are) connected to each three-phase input terminal of the drive motor 45. The inverter 44 is controlled based on control signals from the battery management apparatus 411, or the vehicle ECU 42 which controls the entire operation of the vehicle. By controlling the inverter 44, the output voltage from the inverter 44 is adjusted.

The drive motor 45 is rotated by electric power supplied from the inverter 44. The driving force produced by the rotation of the drive motor 45 is transmitted to an axle (or axles) and drive wheels W via a differential gear unit for example.

The vehicle 400 also includes a regenerative brake mechanism (regenerator), though not shown. The regenerative brake mechanism rotates the drive motor 45 when the vehicle 400 is braked, and converts kinetic energy into regenerative energy, as electric energy. The regenerative energy, recovered in the regenerative brake mechanism, is inputted into the inverter 44 and converted to direct current. The converted direct current is inputted into the vehicle power source 41.

One terminal of a connection line Li is connected to the negative electrode terminal 414 of the vehicle power source 41. The other terminal of the connection line Li is connected to a negative electrode input terminal 417 of the inverter 44. On the connection line L1, a current detector (current detection circuit) 416 is provided inside the battery management apparatus 411 between the negative electrode terminal 414 and the negative electrode input terminal 417.

One terminal of a connection line L2 is connected to the positive electrode terminal 413 of the vehicle power source 41. The other terminal of the connection line L2 is connected to a positive electrode input terminal 418 of the inverter 44. On the connection line L2, the switch apparatus 415 is provided between the positive electrode terminal 413 and the positive electrode input terminal 418.

The external terminal 43 is connected to the battery management apparatus 411. The external terminal 43 can be connected to, for example, an external power source.

The vehicle ECU 42 cooperatively controls the vehicle power source 41, the switch apparatus 415, the inverter 44, and the like together with other management apparatus and control apparatus, including the battery management apparatus 411, in response to operation input from a driver or the like. By the cooperative control by the vehicle ECU 42 and the like, the output of electric power from the vehicle power source 41, the charging of the vehicle power source 41, and the like are controlled, and the vehicle 400 is managed as a whole. Data related to the maintenance of the vehicle power source 41, such as the remaining capacity of the vehicle power source 41, is transferred between the battery management apparatus 411 and the vehicle ECU 42 by a communication line.

The vehicle according to the fifth embodiment is equipped with the battery pack according to the fourth embodiment. Thus, the present embodiment can provide a vehicle equipped with a battery pack capable of not only suppressing self-discharge but also demonstrate excellent cycle life characteristics.

EXAMPLES

Examples will be described below; however, the embodiments are not limited to these examples.

Example 1

<Production of Negative Electrode>

100% by weight of negative electrode active material powder ($NbTi_2O_7$), 10% by weight of acetylene black, 10% by weight of polyvinylidene fluoride, and NMP were mixed together to prepare a slurry. The slurry thus prepared was applied to both sides of an aluminum foil (having a thickness of 15 µm and a width of 12 cm) as a negative electrode current collector in a coating amount of 100 $g/m^2$ to obtain a stack. The stack coated with the slurry was dried and pressed to produce a strip-shaped negative electrode provided with a negative electrode active material-containing layer. The strip-shaped negative electrode was cut out into a rectangular shape along the stacking direction of the negative electrode current collector and the negative electrode active material-containing layer. In the cut-out negative electrode, the negative electrode active material-containing layer had dimensions of 100 mm on the short side and 500 mm on the long side. Likewise, five negative electrodes in total were produced.

<Production of Positive Electrode>

100% by weight of positive electrode active material powder ($LiNi_{0.5}Co_{0.2}Mn_{0.3}O_2$), 10% by weight of acetylene black, 10% by weight of polyvinylidene fluoride, and NMP were mixed together to prepare a slurry. The slurry thus prepared was applied to both sides of an aluminum foil (having a thickness of 15 µm and a width of 12 cm) as a positive electrode current collector in a coating amount of 100 $g/m^2$ to obtain a stack. The stack coated with the slurry was dried and pressed, to produce a strip-shaped positive electrode provided with a positive electrode active material-containing layer. The strip-shaped positive electrode was cut out into a rectangular shape along the stacking direction of the positive electrode current collector and the positive electrode active material-containing layer. In the cut-out positive electrode, the positive electrode active material-containing layer had dimensions of 100 mm on the short side and 500 mm on the long side. Likewise, five positive electrodes in total were produced.

<Preparation of Nonaqueous Electrolyte>

Ethylene carbonate, diethyl carbonate, and propylene carbonate were mixed at a volume ratio of 1:1:1 to prepare a mixed solvent. Lithium hexafluorophosphate was dissolved in the mixed solvent at a concentration of 1 M to prepare a nonaqueous electrolyte.

<Production of Laminated Cell>

Each of five positive electrodes and each of five negative electrodes were stacked on top of each other with a polyethylene separator interposed therebetween, and fixed with a resin tape to form a stack. The respective positive electrodes and the respective negative electrodes were stacked so that the periphery of the negative electrode active material-containing layer did not face the positive electrode active material-containing layer. Namely, the non-facing section was formed on the frame-shaped four sides of the negative electrode active material-containing layer included in the respective negative electrodes.

An aluminum tab was connected to each of the positive electrode current collectors and each of the negative electrode current collectors included in the stack. Next, the stack was put in a container member to produce a laminated cell not injected with the nonaqueous electrolyte. The laminated cell was dried at 80° C. for 12 hours. Then, the laminated cell was injected with the nonaqueous electrolyte in an argon atmosphere and heat-sealed to thereby complete the laminated cell.

<Initial Charge>

Initial charge and discharge were performed once on the laminated cell thus produced at a current value of 1-hour rate in the voltage range of 2.8 V to 1.5 V in an environment of 25° C., and then the battery voltage was adjusted to 2.8 V.

<Aging>

After the initial charge, aging was performed on the laminated cell by holding the laminated cell in an environment of 80° C. for 24 hours, thereby producing a secondary battery including the electrode group according to the embodiment.

After measuring the cycle capacity retention ratio (described later) of the secondary battery of Example 1, the following dimensions were measured when an SEM-EDX observation was performed. The width of the non-facing section on one side in the direction (first direction) parallel to the long-side direction of the negative electrode active material-containing layer was 1.0 mm. The area (NA1) of the orthogonal projection of the negative electrode active material-containing layer to the negative electrode current collector was 52020 $mm^2$, and the area (PA1) of the orthogonal projection of the positive electrode active material-containing layer to the positive electrode current collector was 50000 $mm^2$. The ratio (NA1/PA1) of the area (NA1) to the area (PA1) was 1.04. The area (NA2) of the orthogonal projection of the non-facing section to the negative electrode current collector was 2020 $mm^2$.

Example 2

A secondary battery was produced by the same method as described in Example 1, except that the aging was performed on a laminated cell in which the battery voltage was adjusted to 3.0 V.

Example 3

A secondary battery was produced by the same method as described in Example 1, except that the aging was performed on a laminated cell in which the battery voltage was adjusted to 2.4 V.

Example 4

A secondary battery was produced by the same method as described in Example 3, except that the aging temperature was changed to 95° C. and the aging time was changed to 48 hours.

Example 5

A secondary battery was produced by the same method as described in Example 4, except that $TiO_2(B)$ was used as the negative electrode active material.

Comparative Example 1

A secondary battery was produced by the same method as described in Example 1, except that the aging was not performed.

Comparative Example 2

A secondary battery was produced by the same method as described in Example 1, except that the aging temperature was changed to 100° C. and the aging was performed on a laminated cell in which the battery voltage was adjusted to 3.0 V.

Comparative Example 3

Five negative electrodes were produced by the same method as described in Example 1. Separately, an NMP solution containing PTFE at a concentration of 10% by weight was prepared. Then, the PTFE-containing solution was applied with a brush to the four sides on the periphery of the negative electrode active material-containing layer included in the respective negative electrodes in the width of 1 mm from the edge. At this time, the section of the main surface of the negative electrode active material-containing layer which faced the positive electrode active material-containing layer was protected with masking tape. After the coating, the PTFE-containing solution was dried on a hot plate having a temperature of 120° C., and then the same coating procedure was performed on the other side of the negative electrodes. According to the measurement results after drying the PTFE-containing solution, the coating amount on each side was 0.1 g/m². Thereafter, the masking tape was peeled off, thereby leading to obtention of a secondary battery of Comparative Example 3. Aging was not performed on this secondary battery.

Comparative Example 4

A secondary battery was produced by the same method as described in Comparative Example 3, except that $Li_4Ti_5O_{12}$ was used as the negative electrode active material.

Comparative Example 5

A secondary battery was produced by the same method as described in Comparative Example 3, except that the PTFE-containing solution was applied to the entire region of the main surface of the negative electrode active material-containing layer. According to the measurement result after drying the PTFE-containing solution, the coating amount on each side was 2.5 g/m².

<SEM-EDX Analysis>

A composition analysis according to the SEM-EDX was performed according to the method described in the first embodiment on the electrode groups of the secondary batteries produced in the respective Examples and respective Comparative Examples. The results of the analysis are shown in Table 1 below.

<Measurement of Cycle Capacity Retention Ratio>

Charge and discharge of the secondary batteries produced in the respective Examples and the respective Comparative Examples were repeated in the voltage range of 2.8 V to 1.5 V at 25° C., and the capacity retention ratio of the secondary batteries after 500 cycles was measured.

<Ratio of Cell Capacity to Designed Capacity>

The designed capacity can be calculated from the results of the single-electrode evaluation of the respective positive and negative electrodes. First, a coin cell is produced which adopts, as a working electrode, a positive electrode or a negative electrode separately produced with the same coating amount as that of the laminated cell, and with the use of metal lithium as a counter electrode. Next, the electrode capacity at a predetermined charge voltage was measured for the coin cell corresponding to each of the positive and negative electrodes. A charge curve and a discharge curve of the positive electrode obtained are superposed on top of each other, as are a charge curve and a discharge curve of the negative electrode obtained. The charge and discharge curves obtained by subtracting the voltage of the negative electrode from the voltage of the positive electrode correspond to the charge and discharge curves of the cell. Therefore, the designed capacity of the cell can be obtained from the capacity per unit area at a cut-off voltage. The coating amount or the charge voltage is set so that the charge capacity per unit area coincides between the positive electrode and the negative electrode.

The results of the above are shown in Table 1 below.

In Table 1, the column labeled "Abundance Ratio of Fluorine (Atom %)" shows the abundance ratio of fluorine in the fluorine-containing coating analyzed according to the SEM-EDX. The column labeled "Section Facing Positive Electrode" shows the abundance ratio of fluorine on the surface of the facing section of the negative electrode active material-containing layer that faces the positive electrode active material-containing layer. The column labeled "Section Not Facing Positive Electrode" shows the abundance ratio of fluorine on the surface of the non-facing section of the negative electrode active material-containing layer that does not face the positive electrode active material-containing layer. The column labeled "Proportion of First Fluorine-containing Coating With Respect To Width of Non-facing Section (%)" shows the proportion of the region in which the first fluorine-containing coating is formed from the side surface of the negative electrode active material-containing layer on the main surface of the negative electrode active material-containing layer with respect to the width of the non-facing section. The column labeled "Proportion of First Fluorine-containing Coating With Respect To Area of Non-facing Section (%)" shows the proportion of the region in which the first fluorine-containing coating is formed on the main surface of the negative electrode active material-containing layer with respect to the area (NA2) of the orthogonal projection of the non-facing section to the negative electrode current collector.

TABLE 1

| | Negative Electrode Active Material | Fluorine-containing Coating Formation Process | | Abundance Ratio Of Fluorine (Atom %) | | Width of Non-Facing Section (mm) | Proportion of First Fluorine-containing Coating With Respect to Width of Non-Facing Section (%) | Proportion of First Fluorine-containing Coating With Respect to Area of Non-Facing Section (%) | Ratio of Cell Capacity to Designed Capacity (%) | Capacity Retention Ratio (%) |
|---|---|---|---|---|---|---|---|---|---|---|
| | | Aging Conditions | Application of Coating Agent | Section Facing Positive Electrode | Section Not Facing Positive Electrode | | | | | |
| Example 1 | TiNb$_2$O$_7$ | 80° C., 2.8 V, 24 h | — | 0.5 | 6.0 | 1.0 | 80 | 80 | 99.8 | 95.5 |
| Example 2 | TiNb$_2$O$_7$ | 80° C., 3.0 V, 24 h | — | 0.7 | 9.5 | 1.0 | 90 | 90 | 99.7 | 92.1 |
| Example 3 | TiNb$_2$O$_7$ | 80° C., 2.4 V, 24 h | — | 0.4 | 3.5 | 1.0 | 70 | 80 | 99.7 | 93.3 |
| Example 4 | TiNb$_2$O$_7$ | 95° C., 2.4 V, 48 h | — | 0.4 | 5.2 | 1.0 | 80 | 85 | 100.0 | 94.8 |
| Example 6 | TiO$_2$(B) | 95° C., 2.4 V, 48 h | — | 0.6 | 2.5 | 0.3 | 35 | 30 | 99.9 | 91.5 |
| Comparative Example 1 | TiNb$_2$O$_7$ | — | — | 0.3 | 0.3 | 1.0 | 10 | 15 | 100.0 | 86.8 |
| Comparative Example 2 | TiNb$_2$O$_7$ | 100° C., 3.0 V, 24 h | — | 0.8 | 11.2 | 1.0 | 95 | 95 | 98.1 | 89.2 |
| Comparative Example 3 | TiNb$_2$O$_7$ | — | PTFE (0.1 g/m$^2$) | 0.3 | 32.2 | 1.0 | 0 | 0 | 97.0 | 87.3 |
| Comparative Example 4 | Li$_4$Ti$_5$O$_{12}$ | — | PTFE (0.1 g/m$^2$) | 0.2 | 33.5 | 1.0 | 0 | 0 | 97.0 | 99.8 |
| Comparative Example 5 | TiNb$_2$O$_7$ | — | PTFE (2.5 g/m$^2$) | 31.5 | 32.5 | 1.0 | 0 | 0 | 62.0 | 15.3 |

All of the electrode groups of Examples 1 to 5 had a fluorine-containing coating (the first fluorine-containing coating) on the main surface of the negative electrode active material-containing layer in the non-facing section that does not face the positive electrode active material-containing layer. In Examples 1 to 5, since the abundance ratio of fluorine atoms included in the first fluorine-containing coating was in the range of 2.5 atom % to 10 atom %, the cell capacity actually measured with respect to the designed capacity of the batteries was almost identical. Examples 1 to 5 also had an excellent capacity retention ratio after 500 cycles. The reason therefore is assumed to be as follows: the presence of the first fluorine-containing coating which contained fluorine atoms at a predetermined abundance ratio on the main surface of the negative electrode active material-containing layer decreased the current density at the edge of the positive electrode active material-containing layer, rendering it possible to suppress early degradation of the positive electrode.

As shown in Comparative Example 1, when the aging was not performed, the abundance ratio of the fluorine atoms on the main surface of the negative electrode active material-containing layer in the section not facing the positive electrode, was 0.3 atom %. Namely, in this case, a coating containing fluorine atoms was hardly formed. It is assumed that this could not reduce the current density from the edge of the negative electrode to the edge of the positive electrode, causing early degradation of the positive electrode as a result of repetition of the charge-and-discharge cycle.

As shown in Examples 1 to 3, it is understood that the abundance ratio of fluorine included in the first fluorine-containing coating tends to increase when the battery voltage at the time of the aging increases. However, in Comparative Example 2, in which the battery voltage at the time of the aging was 3.0 V and the aging was performed in a high-temperature environment of 100° C., a coating including the first fluorine-containing coating that contained an excessive amount of fluorine atoms beyond 10% was formed. In Comparative Example 2, the battery capacity with respect to the designed capacity and the capacity retention ratio was inferior to a considerable degree, as compared with Examples 1 to 5.

Also, as shown in Comparative Examples 3 to 5, when the edge of the negative electrode active material-containing layer was coated with the PTFE-containing solution using a brush, a coating containing an excessive amount of fluorine atoms was formed. In this case, the battery resistance increases to a large extent, which tends to lead to a poor battery capacity with respect to the designed capacity and a poor capacity retention ratio. However, when a spinel-type lithium titanium composite oxide (Li$_4$Ti$_5$O$_{12}$) was used as the negative electrode active material, no expansion or contraction of the active material due to charge and discharge occurs; therefore, an excellent capacity retention ratio was achieved.

According to at least one embodiment and Examples described above, an electrode is provided. The electrode group includes a positive electrode including a positive electrode current collector and a positive electrode active material-containing layer on the positive electrode current collector, and a negative electrode including a negative electrode current collector and a negative electrode active material-containing layer on the negative electrode current collector. The area of the orthogonal projection of the negative electrode active material-containing layer to the negative electrode current collector is larger than the area of the orthogonal projection of the positive electrode active material-containing layer to the positive electrode current collector. The negative electrode active material-containing layer includes a facing section which faces the positive electrode active material-containing layer and a non-facing section which does not face the positive electrode active material-containing layer. A first fluorine-containing coating is formed on a main surface of the negative electrode active material-containing layer in at least a part of the non-facing section. The abundance ratio of fluorine atoms included in the first fluorine-containing coating is in the range of 2.5 atom % to 10 atom %. The electrode group can not only suppress self-discharge but also demonstrate excellent cycle life characteristics.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electrode group comprising:
a positive electrode comprising a positive electrode current collector and a positive electrode active material-containing layer on the positive electrode current collector;
a negative electrode comprising a negative electrode current collector and a negative electrode active material-containing layer on the negative electrode current collector; and
a separator formed of a synthetic resin nonwoven fabric or a porous film consisting of at least one selected from the group consisting of: polyethylene, polypropylene, cellulose, polyvinylidene fluoride, wherein
an area (NA1) of an orthogonal projection of the negative electrode active material-containing layer to the negative electrode current collector is larger than an area (PA1) of an orthogonal projection of the positive electrode active material-containing layer to the positive electrode current collector,
the negative electrode active material-containing layer comprises a facing section which faces the positive electrode active material-containing layer and a non-facing section which does not face the positive electrode active material-containing layer,
a first fluorine-containing coating is formed on a main surface of the negative electrode active material-containing layer in at least a part of the non-facing section, and
an abundance ratio of fluorine atoms included in the first fluorine-containing coating is in a range of 2.5 atom % to 10 atom %, wherein
a width of the non-facing section is defined by a distance from a side surface of the negative electrode active material-containing layer to a boundary surface between the non-facing section and the facing section in a first direction along an in-plane direction of the negative electrode active material-containing layer, and
the first fluorine-containing coating is formed on the main surface of the negative electrode active material-containing layer in a region extending from the side surface of the negative electrode active material-containing layer to a position at 10% to 150% of the width of the non-facing section toward the facing section along the first direction.

2. The electrode group according to claim 1, wherein the first fluorine-containing coating is formed on the main surface of the negative electrode active material-containing layer in a proportion of 50% or more with respect to an area (NA2) of the non-facing section to the negative electrode current collector.

3. The electrode group according to claim 1, wherein
a second fluorine-containing coating is formed on the main surface of the negative electrode active material-containing layer in at least a part of the facing section, and
an abundance ratio of fluorine atoms included in the second fluorine-containing coating is in a range of 0.1 atom % or more and less than 2.5 atom %.

4. The electrode group according to claim 1, wherein an abundance ratio of fluorine atoms included in the first fluorine-containing coating is in a range of 2.5 atom % to 6.0 atom %.

5. The electrode group according to claim 1, wherein a ratio (NA1/PA1) of the area (NA1) to the area (PA1) is $1.00 < NA1/PA1 \leq 1.20$.

6. The electrode group according to claim 1, wherein
the negative electrode active material-containing layer comprises a negative electrode active material, and
the negative electrode active material comprises at least one titanium-containing oxide selected from the group consisting of lithium titanate having a ramsdellite structure, lithium titanate having a spinel structure, monoclinic titanium dioxide, anatase-type titanium dioxide, rutile-type titanium dioxide, hollandite-type titanium composite oxide, orthorhombic titanium-containing composite oxide, and monoclinic niobium titanium composite oxide.

7. The electrode group according to claim 6, wherein
the negative electrode active material comprises the monoclinic niobium titanium composite oxide,
the monoclinic niobium titanium composite oxide is at least one selected from the group consisting of composite oxides represented by a general formula of $Li_xTi_{1-y}M1_yNb_{2-z}M2_zO_{7+\delta}$ and composite oxides represented by a general formula of $Li_xTi_{1-y}M3_{y+z}Nb_{2-z}O_{7-\delta}$,
M1 is at least one selected from the group consisting of Zr, Si, and Sn, M2 is at least one selected from the group consisting of V, Ta, and Bi, and M3 is at least one selected from the group consisting of Mg, Fe, Ni, Co, W, Ta, and Mo, and
x satisfies $0 \leq x \leq 5$, y satisfies $0 \leq y < 1$, z satisfies $0 \leq z < 2$, and $\delta$ satisfies $-0.3 \leq \delta \leq 0.3$.

8. A secondary battery comprising the electrode group according to claim 1, and an electrolyte.

9. A battery pack comprising the secondary battery according to claim 8.

10. The battery pack according to claim 9, further comprising:
an external power distribution terminal; and
a protective circuit.

11. The battery pack according to claim 9, comprising a plurality of the secondary battery,
wherein the secondary batteries are electrically connected in series, in parallel, or in a combination of in series and in parallel.

12. A vehicle comprising the battery pack according to claim 9.

13. The vehicle according to claim 12, comprising a mechanism configured to convert kinetic energy of the vehicle to regenerative energy.

14. The electrode group according to claim 1, wherein the first fluorine-containing coating is formed on the main surface of the negative electrode active material-containing layer in only a part or an entire region of the non-facing section.

15. The electrode group according to claim 1, wherein
 the first fluorine-containing coating is formed on the main surface of the negative electrode active material-containing layer in a region extending from the side surface of the negative electrode active material-containing layer to a position at 10% to 100% of the width of the non-facing section toward the facing section along the first direction.

* * * * *